US006319312B1

(12) United States Patent
Luongo

(10) Patent No.: US 6,319,312 B1
(45) Date of Patent: Nov. 20, 2001

(54) STRENGTHENED, LIGHT WEIGHT WALLBOARD AND METHOD AND APPARATUS FOR MAKING THE SAME

(75) Inventor: Joseph S. Luongo, Kingman, AZ (US)

(73) Assignee: Advanced Construction Materials Corp., Kingman, AZ (US)

( * ) Notice: Subject to any disclaimer, the term of this patent is extended or adjusted under 35 U.S.C. 154(b) by 0 days.

(21) Appl. No.: 09/471,448

(22) Filed: Dec. 23, 1999

Related U.S. Application Data

(63) Continuation-in-part of application No. 09/374,589, filed on Aug. 13, 1999, now Pat. No. 6,251,979, which is a continuation-in-part of application No. 09/195,438, filed on Nov. 18, 1998.
(60) Provisional application No. 60/139,618, filed on Jun. 17, 1999.

(51) Int. Cl.[7] .......................... B32B 17/08; C04B 11/00; C04B 16/04; C04B 24/24
(52) U.S. Cl. .......................... 106/675; 106/672; 106/677; 106/680; 106/778; 106/779; 106/783; 106/DIG. 2; 156/39; 156/45; 156/346; 428/292.7; 428/312.4; 428/703; 524/5; 524/423
(58) Field of Search .................. 106/672, 675, 106/680, 677, 778, 779, 783, DIG. 2; 156/39, 45, 346; 524/5, 423; 428/292.7, 312.4, 703

(56) References Cited

U.S. PATENT DOCUMENTS

| | | | |
|---|---|---|---|
| 2,803,575 | 8/1957 | Riddell et al. | 428/312.4 |
| 2,809,949 | 10/1957 | Orth, Jr. | 524/405 |
| 3,022,184 | 2/1962 | Kerr | 106/211.1 |
| 3,103,444 | 9/1963 | Cotts | 252/62 |
| 3,190,787 | 6/1965 | Muller et al. | 428/70 |
| 3,305,518 | 2/1967 | Jacacki et al. | 524/423 |
| 3,414,467 | 12/1968 | Ferrara | 428/533 |
| 3,720,633 | 3/1973 | Nickerson | 524/48 |
| 3,988,199 * | 10/1976 | Hillmer et al. | 162/101 |
| 4,148,660 * | 4/1979 | Lankard et al. | 106/675 |
| 4,148,781 | 4/1979 | Narukawa et al. | 523/222 |
| 4,159,302 * | 6/1979 | Greve et al. | 264/33 |
| 4,174,230 | 11/1979 | Hashimoto et al. | 106/660 |
| 4,283,229 | 8/1981 | Girg et al. | 106/171 |
| 4,297,311 | 10/1981 | Sherman et al. | 264/109 |
| 4,313,997 * | 2/1982 | Ruff et al. | 428/220 |
| 4,328,178 | 5/1982 | Kossatz | 264/69 |
| 4,343,127 | 8/1982 | Greve et al. | 52/785 |
| 4,369,064 | 1/1983 | von Bonin | 106/18.15 |
| 4,392,896 | 7/1983 | Sakakibara | 156/39 |
| 4,433,020 | 2/1984 | Narukawa et al. | 428/113 |
| 4,483,946 | 11/1984 | Barnes et al. | 523/145 |
| 4,514,471 | 4/1985 | Sugimoto et al. | 428/703 |
| 4,686,253 | 8/1987 | Struss et al. | 524/44 |
| 4,695,494 | 9/1987 | Fowler, Jr. et al. | 428/71 |
| 4,810,569 | 3/1989 | Lehnert et al. | 428/285 |
| 5,256,222 * | 10/1993 | Shepherd et al. | 156/41 |
| 5,309,690 | 5/1994 | Symons | 52/309.9 |
| 5,350,554 | 9/1994 | Miller | 264/171 |
| 5,422,387 | 6/1995 | Toms et al. | 524/52 |
| 5,437,722 | 8/1995 | Borenstein | 106/778 |
| 5,480,923 | 1/1996 | Schmid et al. | 524/47 |
| 5,482,551 * | 1/1996 | Morris et al. | 106/780 |
| 5,534,059 | 7/1996 | Immordino, Jr. | 106/778 |
| 5,536,764 | 7/1996 | Nguyen et al. | 524/53 |
| 5,558,710 | 9/1996 | Baig | 106/780 |
| 5,582,670 | 12/1996 | Andersen et al. | 156/242 |
| 5,648,154 | 7/1997 | Koh et al. | 428/313.7 |
| 5,653,797 * | 8/1997 | Patel | 106/781 |
| 5,676,905 | 10/1997 | Andersen et al. | 264/426 |
| 5,720,913 | 2/1998 | Andersen et al. | 264/108 |
| 5,723,226 * | 3/1998 | Francis et al. | 428/688 |
| 5,725,656 | 3/1998 | Shimanovich et al. | 106/778 |
| 5,746,822 * | 5/1998 | Espinoza et al. | 106/785 |
| 5,749,954 | 5/1998 | Law et al. | 106/282 |
| 5,800,756 | 9/1998 | Andersen et al. | 264/129 |
| 5,810,961 | 9/1998 | Andersen et al. | 156/324 |
| 5,827,457 | 11/1998 | Tseng | 264/43 |
| 5,830,305 | 11/1998 | Andersen et al. | 156/242 |
| 5,830,548 | 11/1998 | Andersen et al. | 428/36.4 |
| 5,874,486 | 2/1999 | Bastioli et al. | 523/128 |
| 5,879,825 * | 3/1999 | Burke et al. | 106/802 |
| 5,886,306 | 3/1999 | Patel et al. | 181/290 |
| 5,922,447 * | 7/1999 | Baig | 106/780 |

* cited by examiner

*Primary Examiner*—Anthony Green
(74) *Attorney, Agent, or Firm*—Whiteford, Taylor & Preston, L.L.P.; Gregory M. Stone, Esq.

(57) ABSTRACT

A novel wallboard composition is disclosed comprising a unique combination of synthetic binders selected for their ability to establish a strengthened permanent bond in the final dry state for use in a wallboard composition comprising primarily gypsum, and in a wallboard composition comprising an expanded mineral such as Perlite which largely reduces the amount of gypsum over current gypsum wallboard formulations, thus reducing the weight while maintaining the strength of the wallboard structure. In a preferred embodiment, the lightweight, strengthened wallboard of the present invention also comprises an optional covering veneer that is applied to the top ply of the face paper to provide increased strength, moisture resistance, and fire retardency, and the back paper top ply is treated to provide increased flexural strength. Additionally, this invention relates to the unique manufacturing process to produce the wallboard composition of the present invention in order to create a lightweight, strengthened, moisture resistant, and fire retardant wallboard used to cover walls and ceilings in construction applications. Still further, this invention relates to the apparatus for manufacturing the wallboard composition of the present invention, including a method and apparatus for economically converting a standard gypsum wallboard manufacturing facility into a facility for manufacturing wallboard of the present invention.

34 Claims, 2 Drawing Sheets

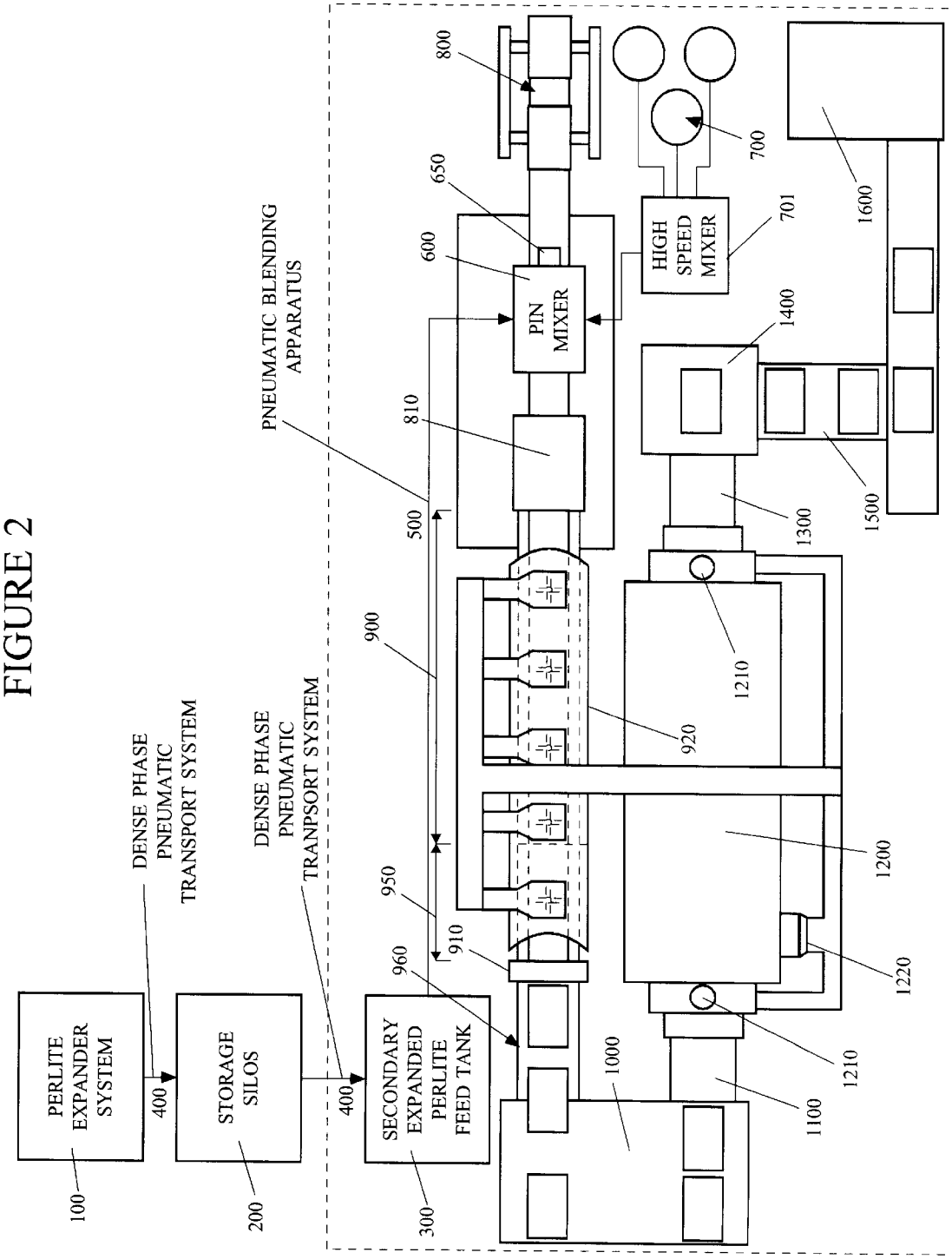

STRENGTHENED, LIGHT WEIGHT WALLBOARD AND METHOD AND APPARATUS FOR MAKING THE SAME

CROSS-REFERENCE TO RELATED APPLICATIONS

The present application is a Continuation-in-Part Application of U.S. patent application Ser. No. 09/374,589 filed Aug. 13, 1999, now U.S. Pat. No. 6,251,979, which application is based upon and gains priority from U.S. Provisional Patent Application Serial No.: 60/139,618, filed: Jun. 17, 1999 by the inventor herein and entitled "IMPROVED WALLBOARD AND METHOD AND APPARATUS FOR MAKING THE SAME," and which application is also a Continuation-in-Part Application of U.S. patent application Ser. No. 09/195,438, filed Nov. 18, 1998 by the inventor herein and entitled "LIGHT WEIGHT FIRE AND MOISTURE RESISTANT WALLBOARD."

BACKGROUND OF THE INVENTION

1. Field of the Invention

This invention relates to new "drywall" compositions and methods for making the same that are useful in the manufacture of wallboard for covering walls and ceilings in construction applications. More particularly, this invention is directed to a novel wallboard composition comprising a unique combination of synthetic binders selected for their ability to establish a strengthened permanent bond in the final dry state, in combination with an expanded mineral such as Perlite which largely reduces the amount of gypsum present in the wallboard product from what has been required by previous gypsum wallboard formulations. This reduction in the amount of gypsum present in the wallboard formulation in turn reduces the weight of the wallboard structure while maintaining its strength. Moreover, the synthetic binders uniquely cross-link with the expanded mineral to form a much stronger bond between the constituent components of the wallboard core material than that which has been available in previously utilized or known wallboard products. In a preferred embodiment, the lightweight, strengthened wallboard of the present invention also comprises a covering veneer that is applied to the top ply of the face paper to provide increased strength, moisture resistance, and fire retardency, and the back paper top ply is treated to provide increased flexural strength. Additionally, this invention relates to the unique manufacturing process to produce the wallboard composition of the present invention in order to create a lightweight, strengthened, moisture resistant, and fire retardant wallboard used to cover walls and ceilings in construction applications. Still further, this invention relates to the apparatus for manufacturing the wallboard composition of the present invention, including a method and apparatus for economically converting a standard gypsum wallboard manufacturing facility into a facility for manufacturing wallboard of the present invention.

2. Description of the Background

Conventional gypsum drywall has been utilized for approximately the past fifty years in the construction industry with gypsum comprising the primary core ingredient. The manufacture of gypsum drywall is presently an expensive, complex, difficult, and tightly controlled manufacturing process. The gypsum wallboard manufacturing process today entails several elaborate steps with significant environmental concerns, both internally and externally, regarding the product itself and the manufacture thereof. An increasingly shortened supply of domestic gypsum rock remains available today, which has necessitated the development and usage of synthetic gypsum as a substitute. However, the production of synthetic gypsum requires an extremely complex synthetic gypsum production facility. Such facilities include FGD (flu gas desulferization) gypsum production plants which are required by the nature of the manufacturing process to be located next to power plant facilities. These power plants utilize high sulfur coal, which is predominate in the Eastern United States, to generate power. The waste produced by these power plants is classified and desulferized into synthetic gypsum. This synthetic gypsum is then calcined and used as a substitute for natural gypsum for use in the wallboard manufacturing process. Given the significant risk of detrimental long-term health effects of a waste slag and coal product, the processing and use of such synthetic gypsum has also fueled environmental concerns. It is an object of the present invention to provide a new and distinctly different environmentally safe class of wallboard for use in the construction industry that utilizes environmentally friendly synthetic adhesives.

The continuously depleting supply of gypsum coupled with the rising demand for wallboard products has caused the price of gypsum and gypsum-based products to rise substantially over recent years. In the field of gypsum wallboard composition, relatively low prices of materials have kept the core of gypsum wallboard unchanged for the better part of the 20th century. However, given the booming construction industry and the increasing demand for housing, the demand for wallboard products has significantly exceeded the available manufactured supply of wallboard. This increased demand has dramatically driven the costs of wallboard products upward. Likewise, the need to supplement the natural gypsum wallboard products with the more costly synthetic gypsum products have also driven up the costs of wallboard products. These increasing cost factors have established a need for a lightweight, strengthened, and re-engineered wallboard product that minimizes the amount of gypsum present in the wallboard formulation.

Attempts have been made in the past to both strengthen and lighten traditional wallboard products, but such efforts have evidenced the addition of substantial costs to the finished product. For example, attempts have been made in the past to use a very low percentage of an inorganic or synthetic binder in wallboard formulations, typically 1% to 2%, in an effort to slightly effect the strength of the wallboard product. However, the amount of binder required to substantially increase strength and remain cost effective has not been realized. As disclosed herein and as a part of the present invention, it has been found that by placing the equipment needed to polymerize the base components of the synthetic binder on-site at the wallboard manufacturing facility, manufacturing costs may be greatly reduced.

Modem gypsum wallboard manufacturing facilities are very expensive in and of themselves, comprising numerous pieces of complex manufacturing and material handling equipment. Traditionally, the removal of the gypsum rock from gypsum mines or quarries is more difficult than strip or surface mining the softer Perlite ore from the mountain or ranges. After mining, the harder and larger gypsum rocks are crushed and reduced to smaller sizes and conveyed to where these smaller rocks are crushed into tiny particles. Next, the crushed gypsum is processed through a complex Calcining system involving a roller mill, a Calcining kettle, an imp mill and/or GC mill to reduce the gypsum fines into a chalk-like gypsum aqueous slurry. This Calcining system and process is expensive as it involves flash-drying and heating the gypsum land plaster or gypsum slurry in order to remove much of the water from the material. Following this dehydration process, the gypsum stucco is stored in holding bins and fed into equipment such as a pin mixer and a screw type conveyer. Water is again added along with other ingredients such as foams, starches, cementious materials and other chemicals to form the final prepared gypsum slurry. The gypsum paste is then spread onto and compressed between facing and backing paper and is cut further down the line. Next, a complex high temperature kiln dries the green gypsum board for approximately one hour or more, which is begun at lower temperatures (approximately 250° F.), then to a higher temperature (approximately 600° F.), and down again to exit from the kiln at lower temperatures (approximately 200° F.), leaving the gypsum board virtually moisture-free. This complex system of processing and material handling equipment is extremely expensive, such that the start-up of a new facility to manufacture a new type of wallboard has in the past been cost prohibitive. It would therefore be advantageous to provide a means by which an existing manufacturing facility could be modified at little expense to produce a strengthened and lighter weight wallboard product.

Perlite and other minerals have previously been used in wallboard construction as a filler, and has likewise been used in a variety of other industrial uses, including abrasives, acoustical plaster and tile, charcoal barbecue base, cleanser base, concrete construction aggregates, filter aid, fertilizer extender, foundry ladle covering and sand additive, inert carrier, insulation board filler, loose-fill insulation, molding filler medium, packaging medium, paint texturizer, propagating cuttings for plants, refractory products, soil conditioner, tile mortar aggregate, and lightweight insulating concrete for roof-decks. Perlite is a glassy volcanic rock having the unusual characteristic of expanding to about 20 times its original volume when heated to an appropriate temperature within its softening range. The resultant expanded product finds a variety of industrial and constructional applications owing to the material's low density with attendant properties of low thermal conductivity and high sound absorption.

Petrographically, Perlite can be described as a glassy, volcanic, rhyolitic rock having a pearl-like luster and usually exhibiting numerous concentric cracks resembling an onion-skin in appearance. Chemically, crude Perlite is essentially a metastable amorphous aluminum silicate. A typical average chemical analysis of Perlite would show a range of 71% to 75% $SiO_2$, 12.5% to 18.0% $Al_2O_3$, 4 to 5 percent $K_2O$, 1% to 4% sodium and calcium oxides, and minor amounts (traces) of metal oxides. Perlite is chemically inert and has a pH of approximately 7. The specific gravity of Perlite ranges from 2.2 to 2.4 (139 to 150 pounds per cubic foot) and has hardness between 5.5 and 7 (Mohs' scale). Crude Perlite may range from transparent light gray to glassy black in color; however, the color of Perlite when expanded will range from snowy white to grayish white.

Commercially, the term "Perlite" also includes the expanded product. When particles of Perlite are heated to a soft consistency, the combined water present (2% to 5%) in the glass vaporizes, forming steam that expands each particle into a mass of glass foam. The original volume of the crude Perlite may be expanded 4 to 20 times at temperatures between 1,200° F. and 2,000° F. Expanded Perlite may be a fluffy highly porous material or may be composed of glazed glassy particles having a low porosity. Dependent upon the inherent physical properties and processing variables, the bulk weight of expanded Perlite usually ranges from 2 to 20 pounds per cubic foot.

Specifications have been established by the American Society for Testing and Materials (ASTM) for the sizing and bulk density of expanded Perlite aggregate used for plaster and insulating concrete. Perlite for filter media uses and for many other uses usually follows specifications for proper sizing and other properties recommended by producers.

Perlite (expanded) can be graded by density in pounds per cubic foot, and classified by product number or trade name for producer and user identification. The expanded product can weigh as little as 2 pounds per cubic foot, but the most widely used bulk-density grade range is from 7 to 15 pounds per cubic foot. The range of expanded Perlite utilized in the wallboard composite core of the present invention is 3 to 10 pounds per cubic foot, but preferably Perlite weighing 4 pounds per cubic foot is utilized in the formulation of the present invention. It has been found that the more friable cryogenic grades in the 3 to 4 pound range are favorable over the heavier grades ranging from 5 to 10 pounds per cubic foot. Grades typical to this range include concrete, plaster, and cavity fill or masonry. The particle size ranges from 100 to 2,000 microns, and preferably from 200 to 1000 microns. Preferably, the expanded Perlite will have a particle size ranging from no larger than 10 mesh sieve size and no smaller than 200 mesh sieve size measured on standard screen scale. The particle size of the preferred expanded Perlite is directly related to the strength of the wallboard core in the aspect of fusion. Particles that are too large tend to space gypsum crystal growth too far apart, and particles that are too small don't allow enough area for the gypsum crystal to fuse onto.

The expanded product is bagged for shipment and generally will be in volume of 4 cubic feet per bag. The expanded product is generally shipped via truck or rail. If by rail, the expanded product may be shipped in bulk dry density designed transport cars.

Expanded Perlite, depending on the expansion process and the grade of Perlite, can affect the expanded weight and can be used in the production of many products where weight is an important factor. In the construction industry, Perlite's incombustibility and low water absorption make it a superior insulating material. Perlite plaster aggregate is used extensively to fireproof structural steel construction and to reduce the weight of interior walls and ceilings. Perlite concrete aggregate roof-decks also insulate and save weight. Expanded Perlite is an important component of roof insulation (gypsum) board, masonry (cavity fill), and floor and wall tiles.

Some of the many important applications of Perlite include its use as an insulator (in cryogenic technology) to hold solidified gases such as liquid oxygen at extremely low temperatures, to absorb oil spills on water and wet surfaces, to clean up effluents containing oily wastes, and as an additive in molding sands.

In sum, while perlite has found a variety of uses in the construction industry, and even as a filler in wallboard products, it has not heretofore been effectively employed as a catalyst for significantly reducing the amount of gypsum required in the wallboard formulation.

Further, the green and/or gray-colored facing and backing paper used on standard gypsum wallboard is commonly low-grade and recycled, and performs poorly under rainy or wet surface conditions during shipping, construction, and the installation process. Weight factors of the gypsum drywall/sheetrock, as commonly termed, have been an ongoing concern during transportation and installation, as have general safety issues, particularly in hanging ceiling boards.

Breakage and loss of material is an adverse factor during brittle gypsum board installation. It would therefore also be advantageous to provide an improved facing and backing paper lacking the shortcomings evident in the prior art.

DESCRIPTION OF THE PRIOR ART

The use of the main ingredient, calcium sulfate hemihydrate $C_ASO_4 \cdot 2H_2O$, in the manufacture of gypsum wallboard and its related products has predominately been unchanged or unchallenged in its base components for over half a century. It has long been a conventional practice to finish the interiors and exteriors of buildings with gypsum core construction materials such as wallboard, lath, or sheathing. In general, these boards comprise essentially a core of set interlaced gypsum crystals disposed between fibrous, especially paper, liner sheets. After the gypsum slurry has set (i.e., reacted with the water from the aqueous slurry) and dried, the sheet is cut into standard wallboard sizes. Methods for the production of gypsum drywall are described, for example, in the Kirk-Othmer Encyclopedia of Chemical Technology, Second Edition, 1970, Vol. 21, pages 621–24, the disclosure of which is hereby incorporate herein by reference.

It has been known to incorporate certain additional agents in the core of gypsum wallboard. These have included, for example, foam aggregate wherein a foam has been shredded to a rough consistency and then incorporated into the gypsum slurry prior to forming and setting thereof. Also, expanded mineral fillers such as perlite and/or vermiculite have been incorporated into the gypsum slurry in small amounts from 0.5 to 10 percent, in addition to organic adhesives such as starch or dextrin, or other fibers. Other agents have also been added, including simple chemicals which react within the gypsum slurry to form gasses. For example, carbonates are added to yield $CO_2$ within the slurry; likewise, other air entraining agents, such as soap foams, may be employed to enable whipping air into the gypsum slurry during mixing.

Unfortunately, however, the amount of air or gas cells, or voids, which can be incorporated is limited, because the strength of the composite wallboard core is reduced when the amount of air cells is increased beyond a certain point. Likewise, the ability of the board to withstand a nail pull through the board is adversely effected by excessive air entraining. Additionally, historically expanded minerals were not added in gypsum wallboard beyond 2 to 3 percent because strength tests were significantly reduced, in both nail pull and flexural break tests, according to ASTM C36 and ASTM C473. While it has been an intention of individual inventors and major manufacturers to produce a lightweight, strengthened, and essentially improved wallboard product over current formulations, the problem of providing a wallboard product with increased strength while reducing its weight at a relative low cost has not been practically realized, either in re-engineering the wallboard itself or the manufacturing process thereof. Many combinations and compositions have been tried and tested in the past, but many remain unutilized due to impractical applications and/or significant increases in production costs. Reduced weight and density boards should meet or exceed industry standards and have strengths equal to or greater than their heavier counterparts according to ASTM standards. Such lightweight wallboard compositions should be able to be manufactured using conventional high-speed manufacturing apparatus and not suffer from other negative side effects of a completely different manufacturing process.

The addition of synthetic binders has very recently been attempted as disclosed in U.S. Pat. No. 5,879,825 to Burke et al.; however, the engineering and chemical research in various combinations of complex chemical formulations and combinations thereof has been quite limited. Additionally, the environmental concerns of noxious fumes under fire engineering standard ASTM testing E119 were not realized or considered, and cost considerations limited the amount of acrylic polymer to 1 to 2 percent, such that a polymer having a minimal cross-linking performance resulted. Further, while the use of Perlite as an antidessicant to prevent the dehydration of gypsum crystals formed during setting of the core composition is disclosed, no consideration is given to introducing an expanded mineral, such as perlite, as a substitute for gypsum as one of the structural foundations of the wallboard core, nor the specific need for a synthetic binder composition for establishing a complete crosslinking between the constituent elements of the wallboard core in order to create a molecular change within the strengthening agent, which molecular change is in turn required to completely bond a substantially reduced amount of gypsum with the other components of the wallboard core. Likewise, Burke et al. '825 discloses the use of its "strength-enhancing agent" only in the amount of 0.25 percent to about 2.5 percent solids, thus greatly limiting the cross-linking effect of the agent and the ability to significantly reduce the weight of the finished wallboard product. Moreover, the chemical properties of the polyvinyl acetate emulsion of the instant invention, containing block copolymers of partially hydrolyzed polyvinyl alcohol, and the stabilized polyvinyl acetate particles in aqueous solution of the instant invention are very chemically different from the disclosed components of Burke et al. The polyvinyl acetate emulsion of the instant invention comprises distinct chemical formulations and exhibits distinct properties from those either taught or suggested by Burke et al., including being manifested in a water soluble, lower cost, aqueous solution which is milky white in color, chemically designed to be easily diluted in water, of higher glass transition temperature (Tg) values, having unique percentages of partially hydrolyzed polyvinyl acetates co-blocked and stabilized with specific molecular weight polyvinyl alcohol derivatives to produce a lower cost, easily dispersant binder that chemically cross-links with boron and starch, and which has less kiln stack emissions of similar quantities, and thus is more environmentally friendly.

Other attempts have been made in the prior art to provide adhesive compositions for use in bonding cellulosic and other porous materials. For example, U.S. Pat. No. 3,720,633 to Nickerson discloses a polyvinyl alcohol-based adhesive composition for use in paper converting applications. However, once again, no mention or suggestion is made of the need for a specific synthetic adhesive composition able to establish a sufficient cross-linking between its components to bind with gypsum and/or an expanded mineral to create a core material having the strength characteristics necessary to utilize the material as a wallboard sheet, while having a reduced weight over compositions that have been previously known.

Still further, U.S. Pat. No. 5,534,059 to Immordino, Jr. discloses a machinable plaster composition comprising a polymer-modified, gypsum based material, including a water redispersable powder polymer binder. However, in this instance, the polymer binder is used to produce a much more rigid, and thus easily machinable, plaster blank for use in conjunction with computer aided milling machines than previous compositions, and once again fails to disclose or suggest any combination which might be used to produce a strengthened yet lightweight wallboard having a synthetic binder which is fully cross-linking in order to establish a rigid bond with the gypsum and/or expanded mineral constituents of the wallboard core.

It would therefore by highly advantageous to provide a high strength, lightweight wallboard product which reduces the need for gypsum in the wallboard composition, and which utilizes a synthetic binder composition that enables a complete cross-linking of the constituent elements of the wallboard core to form a rigid structure with the structural integrity to withstand the structural requirements of traditional wallboard products. Such wallboard products should meet industry requirements, and likewise have a strength at least equal to previously known wallboard products while reducing the weight of the finished wallboard sheet. Such wallboard should also have the ability of being manufactured at existing, traditional gypsum wallboard production facilities without requiring such facilities to undergo a major renovation to undertake the new composition's production.

SUMMARY OF INVENTION

It has been discovered that a composition consisting essentially of a unique combination of synthetic binders selected for their ability to establish a permanent bond in the dry state, combined with an expanded mineral (e.g., Perlite and crushed Perlite), organic binding adhesives, drying agents, and hardeners, all contained within a covering of treated moisture and heat resistant paper material, produces an improved lighter-weight, strengthened wallboard product. The technology of the present invention utilizes an expanded mineral which physically becomes part of the composite matrix due to the complex formulation of binders attaching themselves to the mineral, instead of the mineral only acting as a filler. In comparison to the 1 to 10 percent of mineral filler previously utilized in gypsum wallboard, the expanded mineral can incorporate anywhere from 13 to 60 percent of the core composite of the present invention, thus dramatically decreasing the amount of gypsum required to makeup the core.

Numerous significant improvements have been made available through the improved wallboard of the present invention. First, the wallboard composition of the present invention enables a significant reduction of the amount of calcined gypsum required to produce the wallboard. This reduction in the amount of calcined gypsum stucco (through the use of perlite in the wallboard composition) in the method of the present invention expands the production capabilities of current wallboard manufacturing plants. Typically, the gypsum plants are limited in capacity production due to grinding of the gypsum ore or in calcination of the synthetic gypsum. Stretching the amount of gypsum required while reducing the energy and overall cost required greatly enhances the manufacturing production capabilities of the modified wallboard manufacturing facility of the instant invention.

More particularly, calcining equipment and gypsum supply have historically been the limiting factors in the production capacity in wallboard manufacturing facilities due to grinding limitations or calcine kettle limitations. Enlarged milling capacities become increasingly expensive as the gypsum calcining equipment is enlarged and/or improved in newer gypsum plant production. Typically, a standard wallboard manufacturing facility has one calcining operation supplying each wallboard production line. Additionally, the current domestic gypsum ore demand far exceeds the present supply; thus, the ability to spread the current gypsum ore supply and decrease the amount of gypsum grinding required in the present invention improves the production capacity of the wallboard manufacturing plant. Also, the present invention enables gypsum wallboard manufacturers to reduce the amount of calcined gypsum required to run a single boardline, and utilize their current single boardline gypsum supply to operate additional wallboard production lines, thus greatly increasing the production capacity of a given wallboard facility. As a result, the expense of purchasing additional expensive calcining milling equipment to increase production capacity is reduced.

A second benefit of the lightweight technology of the present invention allows for a wallboard composition that is significantly lighter in weight (up to fifty percent lighter) than current traditional heavy gypsum wallboard formulations. This reduced weight also results in transporting lighter loads, in turn reducing transportation costs. Further, job site labor costs are reduced by enabling the workers to handle lightened loads, such that the installation process is made easier and less costly. Similarly, the potential for heavy wallboard related injury accidents to the tradesmen that install the wallboard are reduced.

Yet another benefit of the strengthened wallboard of the instant invention is the reduction in the amount of board breakage and losses due to manual or machine transport to the installation site, due to the fact that the composition of the instant invention provides the wallboard with greater flexibility than has been known in previous wallboard compositions.

Still further, the wallboard composition of the instant invention exhibits equal or greater strength than current heavy gypsum wallboard, with improvements in moisture resistance and flame resistance that exceeds current industry standards. This lightweight and strength factor equates to decreased structural support load bearing and lessens the total support strength required in any project, in turn further reducing overall construction costs.

The specific constituents of the wallboard core (as set forth in detail below) have been found to improve upon the overall structural strength of the wallboard, lighten its weight, decrease the amount of airborne particulates during breakage, decrease its brittleness, and expand its flexibility. Further, the high quality wallboard composition of the present invention is completely cost effective to manufacture using typical existing wallboard manufacturing equipment and practices with limited minor modifications and additional equipment, as further described herein.

The attempted addition of synthetic binders in the past to wallboard compositions have reduced the ability to cut the finished wallboard sheet during installation with a utility knife. However, th composition of the instant invention was developed after several hundred tests and analysis of numerous chemical combinations, with extensive chemical technical research and testing to realize a brittle cross-linking complex polymer that combines and fuses with the mineral and expanded mineral, that is easily cut and snapped with a utility knife as applied in standard construction industry use. Further, there has not previously been available a lightweight, strengthened, and re-engineered wallboard product formulated with minor low cost changes in the manufacturing process that is environmentally friendly and cost effective to produce.

A polyvinyl acetate emulsion or vinyl acetate homopolymer emulsion were tested and found favorable for use in the binder of the instant invention. Vinyl acetate emulsions tested were selected and preferred over acrylic or other petrochemical-based emulsions or liquid plastics for several specific reasons. First, the most crucial practical factors in selecting the preferred type of adhesive are performance of the adhesive in binding the wallboard core, and cost relative to that performance. Such cost factors include both the cost of the base components, such as vinyl acetate monomer (VAM) (which today is preferably produced from ethylene) that make up the adhesive, and the cost to make the final product. It was found that vinyl acetates provide the lowest cost while maintaining assurance of high adherence and coherence capabilities to attach to the minerals in the wallboard core, namely, gypsum and/or perlite. Secondly, a deliberate effort was made to determine and utilize a low cost, final stage, brittle-type plastic in emulsion or liquid initial state, that when hardened would have the ease of a clean snap when cut with a utility knife. It was discovered that the vinyl acetate adhesive family performed superior to sodium silicates in meeting these requirements, even though sodium silicates were lower in overall cost. Thirdly, test results proved that water solubility of the adhesive and ease of dispersion into the final core composite was crucial to fabricating the wallboard without paper blows.

Also, it was discovered that board flexibility during actual board installation, or during the manufacture of the board as it travels over rollers and curved rises in and out of the drying kilns was improved through the use of more plastic adhesives (such as vinyl acetate) than starch as the binder. While vinyl acetates of all types were found to be less costly and performed well, vinyl acetate emulsions with 0.10% to 30% polyvinyl alcohol were further preferred and found to provide unforeseen benefits over powdered polyvinyl acetates. First, vinyl acetate emulsions containing polyvinyl alcohol are available at far less cost (approximately one third) than powdered polyvinyl acetates. Further, vinyl acetate emulsions when properly added and diluted for quick dispersion in the metered water or water solution feeds, prior to entrance into the gypsum slurry mixer, dispersed and performed better than powdered polyvinyl acetates, thus simplifying the manufacturing process and reducing costs caused by flawed boards. Better results in terms of reactivity, dispersion, and ease of mixing occurred in test samples when the vinyl acetate emulsions were strengthened and stabilized with polyvinyl alcohol. It was discovered that the optimum molecular weight of the preferred polyvinyl alcohol selected to strengthen and stabilized the vinyl acetate emulsion is a function of the type of gypsum stucco prepared, and the length of time the final vinyl acetate emulsion needed to be stabilized. In final prepared gypsum stuccos that had higher percentages of certain clays (i.e., above 1% of clays commonly found in some gypsum deposits), naturally occurring in or with the gypsum ore, lower molecular weight polyvinyl alcohols exhibited better results with less initial thickening of the wet gypsum slurry mix.

Environmental factors and concerns must also be evaluated when selecting the preferred adhesive, such as noxious fumes emitted in burning test samples and kiln stack emissions while heating and drying the board during the manufacturing process. Plant operational environmental concerns and plant kiln stack emissions are critical factors for manufacturers to consider in evaluating the use of synthetic adhesives. Acrylics and polyurethanes exhibited higher stack emissions, noxious fumes in burn tests, and presented more environmental operational concerns over similar percentages of vinyl acetate emulsions.

Additionally, vinyl acetates reacted well and cross-link in the presence of boron with starches to create a final tacky binder, at the proper percentages set forth below, that forms a brittle plastic excellent for binding the core of the wallboard product in such a way as to maintain superior strength characteristics while reducing the overall weight of the wallboard.

It has also been determined that the addition of small amounts of accelerators or strengthening agents described below can be added to the final polyvinyl acetate emulsion to increase strength and final composite set performance. To describe this microscopically, the binder is diluted in the processed water to disperse throughout the wet gypsum and perlite slurry in the pin mixer. An accelerator or strengthening agent is added to the back side of the gypsum slurry pin mixer, to begin to chemically increase the set of the binder once the formed wallboard is proceeding downstream to the rotary knife. Optimally, the initial set time of the board is decreased such that the wallboard can be cut in less time. Thus, the board line can be run faster producing more wallboard in a shorter period of time. Potassium or other alkali elements or compounds can be added at 0.001% to 3% of the total wallboard wet weight at the last stages to increase the rate of the set time of the binder and ultimately decrease the initial set of the board. While Potassium Sulfate has been utilized to decrease the initial set time of the green wallboard prior to the knife, too high or too small amounts can actually burn the gypsum crystals and create a "punky" or powdery final wallboard that has lost its strength. The binder (vinyl acetate emulsion) reacts with the accelerator (potassium sulfate) to retard or even eliminate the burning of the gypsum crystals. In the case of adding the potassium sulfate, it is important to mix it into the vinyl acetate emulsion solution just prior to entering the solution into the pin mixer so that these compounds begin to react first. As described in greater detail below, final exhaust temperatures down the board line can be increased to assist with the composite reactions and therefore decrease the set time of the green board prior to being cut at the knife.

Actual plant manufacturing test runs of the wallboard compositions described herein were conducted for several hours each, and using a variety of gypsum ore and gypsum stucco preparation methods. The test runs showed improved ASTM test results at each run. The process of introducing and adding sufficient amounts of the synthetic binder into the final gypsum stucco was successfully completed during each test run, such that there were not problems in the manufacturing process of making the wallboard. However, improved results occurred when the binder was diluted in the metered water or other prepared water solutions, for direct feed prior to the gypsum slurry mixer. Higher ASTM lab test results occurred when utilizing the optimum design combinations and percentages set forth in the examples below of vinyl acetate and polyvinyl alcohol emulsions, with each particular type of gypsum stucco supplied during the four test runs. Thus, by optimizing the final polyvinyl acetate homopolymer or polymer emulsion, optimum test results were achieved in both the test lab and in actual manufacturing test samples.

Optionally, reinforcing fibers, fire retardants, water repellents, and other water proofing materials may be part of the composition. Further, the technology of the present invention allows for decreased set times from the pin mixer to the knife in laboratory testing, which in turn increases boardline manufacturing speeds far beyond what is currently being realized. As manufacturing speeds increase, so does production, enabling greater amounts of wallboard to be produced to meet the current demand. This complex formulation of binders can be seen to be utilized in a wide variety of other building materials as well.

The paper covering or veneer of traditional gypsum wallboard consists of wastepaper constituents that include, but are not limited to, waste newspapers, old corrugated papers, kraft cuttings, and flyleaf shavings. As a result, there are wide variants in wallboard covering coloration which include brown, tan, grey, pink green and grey-white colors. Additionally, traditional gypsum wallboard strength is largely dependent on the strength of the covering paper, as evidenced by the dependence of the results of the flexural break strength and nail pull resistance tests (according to ASTM C-473) on paper fiber strength. Optionally, the present invention provides increasing break strength of the paper covering sheets by increasing fiber length and/or by altering the top ply by utilizing a paper laminate which provides consistent off-white colorization.

The improved, strengthened core material of the instant invention also provides increased compression, shear, and tension loading test results in comparison with the conventional non-reinforced gypsum drywall. ASTM Test Standard C79 standard specifications for gypsum sheathing board require that specimens shall surpass an average surface water absorption of not more than 1.6 g after 2 hours of elapsed time (Section 5.1.7). While gypsum wallboard is required to meet the above ASTM standards, moisture resistance and adverse weather conditions have been long-term problems with gypsum drywall. The improved wallboard of the instant invention comprises an improved moisture resistant cover and core material that far surpasses ASTM C79-5.1.7. Thus, the present invention improves the structural strength, moisture resistance, and weight factors in the design of a new wallboard or ceiling board to be utilized as a construction material, whereby gypsum is not the primary core ingredient.

Moreover, current wallboard core formulations, once dried, have common micro-cracks, form more brittle core composites, and exhibit less tolerant processed board flexibility. Paper fibers, or other synthetic fibers, have been utilized more in the past to hold the core composite together, yet have been insufficient to stop board drying over time, and increase short or long term micro-cracking and ultimate core breakdown or spot load failure. Thus, the development of the synthetic adhesive technology of the instant invention has developed critical improvements to board flexibility, moisture retention, and long term, sustained and improved strength.

A preferred embodiment of the invention is further directed to a method for producing expanded Perlite wallboards of a thickness not less than ¼ inch and not greater than 1 inch comprising the steps of: adding starch, boric acid, roamer, gypsum, and a latex vinyl acetate emulsion with water to expanded Perlite to form a composition; the aqueous slurry of settable Perlite is enveloped between two high quality paper cover sheets comprised of recycled virgin pulp and formed into a board; directing the continuous board away from the forming apparatus to a cutting knife where it is cut to desired length; and finally drying the board in a high temperature kiln at temperatures ranging from 75° C. to 325° C. Optionally, the process further includes the steps of forcing hot air to an encapsulated section of board line, starting the curing process prior to the board reaching the board cutting knife.

As previously mentioned, gypsum board manufacturing is a complex process from the collection of the gypsum rock to the production of the completed wallboard. However, the improved wallboard product of the instant invention, as described more fully in the examples below, offers increased wallboard production capacity from a given gypsum supply over traditional gypsum wallboard products and methods of manufacture. Optionally, when gypsum is not utilized in the wallboard core, the entire calcining system is eliminated from the manufacturing process, and curing temperatures in the manufacturing are substantially reduced. This also greatly reduces the overall production cost of the improved wallboard of the instant invention.

Yet another improvement of the improved wallboard product of the present invention comprises the environmental improvements resulting from a reduction of the half-life of the breakdown of the wallboard core material. Perlite is a more inert material than gypsum. Thus, it is safer to the environment because it does not react with or leach into ground water. Further, the adhesives used in the wallboard product of the instant invention decompose very quickly and easily. Thus, the improved wallboard of the present invention provides a lightweight, strengthened, fire retardant, whitish-covered Perlite wallboard with environmental improvements that is competitively priced to traditional gypsum wallboard products.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 2 is a schematic view of the perlite wallboard production facility of the instant invention.

DETAILED DESCRIPTION OF THE INVENTION

Figure 1:
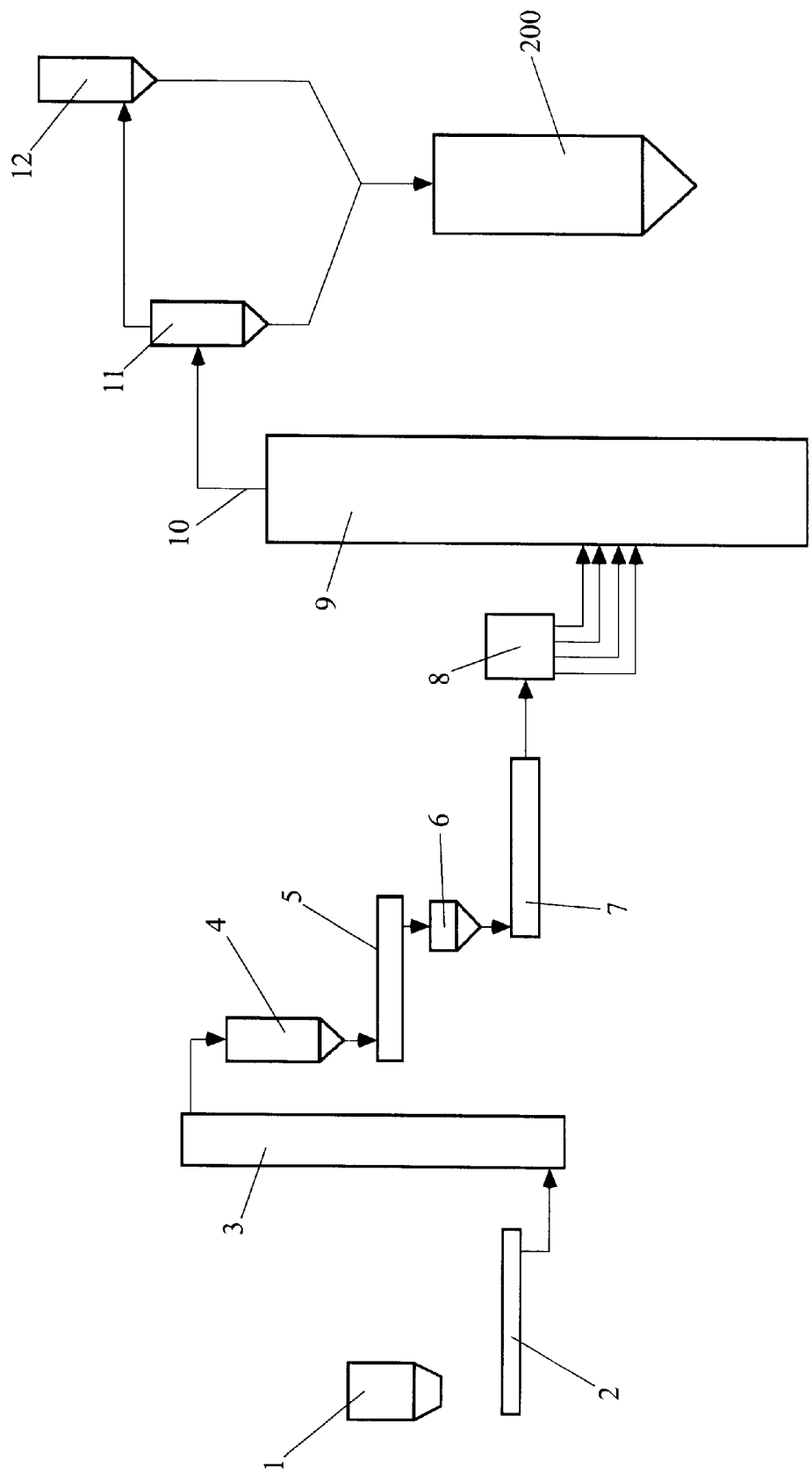
FIG. 1 is a schematic view of the perlite processing arrangement of the instant invention.

The strengthened core of the improved wallboard of the instant invention contains gypsum at up to about 60% volume by weight of the total weight of the slurry, and expanded Perlite in the range of 0.5 to 60% volume by weight of the total weight of the slurry.

In a quest to find the optimum particle size of Perlite for use in a lightweight wallboard of the present invention, it was discovered that not just any ore was or could be utilized to expand to the preferred finished expanded product or mineral. The benefit of a good ore for expanding Perlite is key to the end result, with processing playing a major role. Crushing the ore to uniform particle size in the perspective sieve or screen size and drying to proper hydration in the expander strongly affect how the perlite expands and to what final size. Perlite ore varies in consistency and grade with a variety of textures that appear to be related to the depth and type of emplacement in the perlitic dome. The lighter weight, near-surface pumiceous grades of a very friable nature do offer low expanded weight when expanded, but its pronounced friability during milling and handling make its usefulness somewhat limited. Although it is lightweight when expanded, its low density and thin fragile walls cause it to break under pressure. This pumiceous material does not have sufficient compaction resistance for strength development in the core of the present invention. The more dense ores of a granular or classical concentric texture are preferred for expanding to a lower density without compromising compressive strength. By varying furnace input specifications (i.e., temperature from 1000° .F to 2100° F., rate of CRE flow, particle sieve size distribution, and internal moisture content of ore), perlite will expand to intermediate density with a relatively coarse cell wall structure making it suitable for use in the core of the present invention. Thin section studies of expanded Perlite particles reveal the internal structure to be quite variable depending on the source. Some perlites are considered hard and have a high compaction resistance, while others are considered soft and have low compaction resistance. Lab testing has proven that Perlite in the middle of the range of what is considered to be hard or soft ore (as determined by the field geologist) listed above are most preferred in order to maintain as low as possible the expanded density and weight of their preferred Perlite.

The binder consists of a mixture composed primarily of one or more of the following chemicals: Vinyl acetate polymer, liquid plastics such as urethanes and polyurethanes, acrylic polymer, water-based modified aliphatic polymers, water soluble sodium silicates solutions, water-based polyvinyl chloride solutions, and polyvinyl alcohols. Drying agents such as potassium sodium aluminosilicate, Purmol, or fine silica were also used to quickly drive off moisture. Isopropyl alcohol was also used in place of water as a liquid mixing agent. Through the use of the above listed chemicals, the core was hardened and stiffened, enabling the improved wallboard to cut more easily and cleanly than typically found with traditional gypsum drywall.

The preferred composition of the improved wallboard product of the present invention includes a starch, boric acid, vinyl acetate, and gypsum. It has been found that this combination (in the proportions set forth below) offers the best results for weight, strength, setting and bond of all the examples listed. After applying and analyzing a wide variety of adhesives by themselves and in combination with one another, it was determined that a binder having this composition would allow the wallboard to perform as closely to what is currently used while adding strength and reducing weight. While gypsum remains an optional element of the improved wallboard of the instant invention, and therefore is not essential to the production of a functional wallboard product, its use in the composite core of the wallboard of the instant invention does provide several unforeseen benefits. One such unforeseen benefit is the creation of a product that can be applied in the same manner as is currently practiced for the manufacture of traditional gypsum wallboard, using the same tools of the trade and the same techniques by existing tradesmen. Further, gypsum improves the cutting or snap characteristics of the board of the instant invention, as well as adding to the board's flexibility. Although gypsum is not crucial to the strength of the improved wallboard of the instant invention, it adds to the overall bond characteristics of the binder. The combination of starch, boric acid and vinyl acetate in itself is sufficient to bond the Perlite together in producing the composite core of the instant invention. However, the addition of gypsum into the formulation of the improved wallboard product of the instant invention, in comparison to other cementious materials, became preferred due to excellent compatibility of the four components listed above.

Still another benefit of including gypsum in the composition of the instant invention involves the setting of the board between the forming equipment and the knife. The optional pre-heating system (described in detail below) starts the curing of a "gypsum free core" to provide a pre-cut set or hardening of the continuous board prior to the board being cut at the knife. Using gypsum eliminates the need to pre-heat the board to get a set or hardening sufficient to cut the board without the slurry oozing out of the ends, and creates a hard enough board to be handled by the post knife inverting equipment.

Still further, gypsum adds to the fire retardant capabilities of the composite core.

In sum, the inclusion of gypsum as a constituent of the composition of the wallboard product of the instant invention creates a gypsum-friendly modification to existing gypsum wallboard manufacturing facilities, and in doing so creates an improved, strengthened, lightweight wallboard product that can be completely and easily transitioned into gypsum wallboard manufacturing facilities.

Optionally, an improved wallboard cover material consists of a manila colored moisture resistant paper face sheet in the range of 40–50 pounds with an altered top ply. In traditional wallboard structures incorporating a cover material composed of recycled paper pulp, the length of fibers in the cover material is between ½ and ¾ inches. The instant invention, however, employs a top ply sheet composed of virgin fibers of 1 inch or greater. While papers incorporating fiber lengths of greater than 1 inch have been produced in the past, to the best of the inventor's knowledge, no such virgin pulp has been applied previously to the top ply cover sheet of a wallboard sheet. Thus, the inclusion of such extended length fibers into the wallboard cover sheet of the instant invention provides the unforeseen and unobvious benefit of providing a much stronger break strength than previously known wallboard structures.

The unique application of the optional spec paper cover sheets of the wallboard of the present invention is completely formed by any well known paper forming process. Using 100 percent "virgin stocks" for the top ply of the face paper cover sheet allows for predictable liner strength while also eliminating some of the clays and fillers associated with current completely recycled wallboard paper. By integrating a virgin pulp top ply with existing recycled wallboard paper plies, increased strength and wet handling characteristics are achieved. First, a paper cover sheet is made generally comprising a multiply sheet manufactured on a cylinder machine. Conventional sizing compounds are added to selected vats such as rosin and alum to internally size some or all plies. The plies are removed and laminated to form an essentially unitary web of paper. After being dried, the paper is coated with a water emulsion of the synthetic size of the class consisting of certain substituted succinic acid anhydrides, certain substituted glutaric acid anhydrides and the reaction product of maleic acid anhydrides with an internal olefin. This process allows for effective absorption into the bond liner of the core side of the paper to provide a mechanical linking of the paper to the composite core.

If bituminous or waxy water-repellent materials are used, they comprise from about 1.0 percent to about 10 percent of the Perlite weight by volume. These materials may be applied to the Perlite from molten states or as emulsions. If silicone emulsions are used, the silicone comprises from about 0.01 to about 2 percent of the Perlite by weight. The silicone emulsions may be applied directly to the Perlite as it exits the expander (as set forth in greater detail below) by means well known in the art.

The addition of a calcium sulfate based compound may also act as a filler material. Many of the preferred samples required no calcium sulfate mixture, although some samples have small percentages ranging from 5% to 15%.

A compatible fire retardant, such as boric acid, zinc borate, sulfamates, diammonium phosphate, nitrogen compounds, antimony oxide, silica, titanium oxide, zircon and others can be used and comprise from about 0.15 percent to about 3 percent by weight of the board. These fire retardants can be added to the formulation by powder or solution during the slurry mixing process, and also by spraying onto the paper covering for the purpose of fire retarding the laminate covering paper of the wallboard. The examples of applying fire retardants are listed as follows:

Example 1 (Fire retardant, moisture resistant system): this system sprays fire retardant solutions directly onto the board as it leaves the cascade sections and enters the take off area of the manufacturing equipment. This is accomplished by using spray heads overhead together with switch activators to trigger the action as the board passes by on the conveyor. Additives are supplied by storage tanks and pressure type discharge systems. The additives are sprayed directly on the face paper.

Example 2 (Fire Retardant): another way to apply a fire retardant quality to the paper is to add it in dry form during the Krafting process of the paper's manufacture. Small particle distribution of fire retardant are added to the pulp slurry prior to extrusion into the paperboard. This allows for the fire retardant to be completely integrated into the paper. This fire retardant could be zinc borate, antimony oxide, nitrogen compounds or sulfamates (sulfer compounds). These are all common fire retardants in paper. The moisture resistance element must still be sprayed on using the configuration described above in example 1. Furthermore, the composite core may also be fire retardant treated during the mixing process with the addition of compatible fire retardants into the slurry during the mixing process.

The binder, which may be organic or inorganic, is especially selected for the property of permanent tackiness in the dry state. Preferably, a self-crosslinking permanently tacky polymer, such as a vinyl polymer, is used. Examples of polymers useful as binders include organic materials such as starch and silicates, and inorganic materials such as polyvinyl acetate, vinyl acetate, carboxylated vinyl acetate-ethylene, vinyl chlorides, urethane, and polyurethanes, with solvents such as dipropylene glycol monomethyl ether, diethylene glycol monobutyl ether, triethylamine, acrylic resins, modified aliphatics, epoxies, polyvinyl alcohol, and combinations thereof.

It is important to note that the unique adhesive technology that is described below is completely new and unobvious to the manufacture of wallboard products. This process adds a synthetic variable into an already well-used natural adhesive formulation of starch and borate. The overall result is a binder which, during the wallboard manufacturing process, undergoes a chemical change which provides for complete crosslinking between the starch, borate, and synthetic adhesive to form a strengthened web for gripping the Perlite and forming a rigid core.

Cross-linking of the binder utilized in the present invention with the starch polymer chain is brought about through boron or the use of boric acid. It was originally believed that the commonly used compound boric acid was a sufficient source of boron for the process of the present invention to cross-link the hydroxyl groups of the starch with the vinyl acetate emulsion branch polymer chains. However, large scale test runs of the wallboard of the instant invention revealed an occasional high water demand when standard technical grade ortho boric acids were used, as is common in wallboard production. These fluidity problems were taken back into the laboratory where extensive testing was performed. The pH of the boric acid (6.1 in 0.1% solution) and its low molecular weight were found to be causing some fluidity decrease and viscosity increase in slurry formation. In these circumstances, the solution is to replace the boric acid with use sodium tricarbonate pentahydrate (5 mol) or sodium tetraborate decahydrate (10 mol). The amount of borax or boric acid should be limited in the range of not higher than 0.35% of the total wet weight of the final slurry, as it has been found that higher concentrations can cause gelling of the polyvinyl acetate emulsion and affect strength.

Currently, Perlite is used as a filler or additive to take up space in traditional gypsum wallboard compositions. However, the instant invention utilizes the expanded mineral Perlite as part of the composite, adding strength to the core as the binder grabs onto the Perlite. Starch and borate are often added to the traditional wallboard composition in order to protect the delicate gypsum crystals and to ensure proper crystal growth of the gypsum constituent of the wallboard core as the wallboard is heat treated in a drying kiln at extreme temperatures. However, starch and borate also combine to form a natural adhesive. When starch is treated with borate, interchange linkages are formed throughout the borate anion structure resulting in modifications of the physical properties of the polymer system. Traditional gypsum compositions do not require an additional binder to give the wallboard strength, but rather rely on gypsum crystal growth brought about by heat treatment of the wallboard in its final manufacturing stage. Thus, traditional gypsum wallboard compositions do not rely on the adhesive nature of the combination of starch and borate.

The wallboard composition of the present invention, however, does require an additional binder. It has been found that adding another polymer, preferably vinyl acetate, to the starch polymer and boric acid enables a cross-linking to occur between the three constituents. By crosslinking the synthetic polymer chain with the starch and borate polymer chain, more extensive chemical changes are brought about. On a molecular scale, the polymer chain branches extend in all directions, attaching to the Perlite and increasing the overall strength of the board.

The polymerization of polyvinyl acetate has developed over recent years to prefer the use of ethylene due to the benefits of lower cost and plasticizing efficiency. The efficiency of plasticizing with ethylene or with the 2-ethylhexy esters of acetic or maleic acids provides greater benefit over the vinylation of stearic acid to create the vinyl acetate monomer (VAM). The cracking of ethylene by reaction occurs in a pressure vessel using oxygen and/or acetylene. A vinyl acetate monomer (VAM) is created first from this process, as a precursor, which then is usually shipped and polymerized to polyvinyl acetate, and then on to polyvinyl alcohol. A proportion of the vinyl acetate homopolymer is further polymerized to polyvinyl alcohol. Polyvinyl alcohol must be produced by hydrolysis or alcoholysis of the polymeric vinyl ester. The polyvinyl alcohol is blocked and the vinyl acetate particles are colloidally stabilized. Recently introduced vintage monomers, such as vinyl neodecanoate, and vinyl neononanoate, have been employed to improve the hydrolytic stability and water resistance of emulsion copolymers.

The manufacture of the polyvinyl acetate emulsion containing polyvinyl alcohol at the wallboard manufacturing facility provides many distinct advantages. The cost of the emulsion is reduced in the weight and transportation cost of the main individual components. Much experimentation and field testing have confirmed that the final PVA emulsion for the application in wallboard should be accurately optimized. PVA emulsions have been made for other applications, but have not been used in wallboard manufacturing before. Accelerators, strengthening agents, percentages of PVA and PVA1's, proper end foam generation controls, additives, and stabilization requirements can be uniquely controlled for optimization in wallboard usage. Also, important to factor in is the fact that the more expensive cost requirements to stabilize and protect from bacteria the final PVA emulsion transported are reduced, because the PVA emulsion created is continuously used in the manufacture of the wallboard. Also, a consistent quality controlled source of supply is always readily available. Climate conditions (such as winter freeze problems that adversely affect PVA performance), potential contamination of the product in multiple handling, premature agitation which can effect strength performance, and storage buildup of the dried emulsion can be reduced and therefore lower overall cost of the PVA emulsion.

Further, newer improved manufacturing techniques to make PVA emulsions can be employed and master linked computer controlled to optimize production quality and capacities immediately required for the changes in the wallboard formulations of the various sized and types of wallboard products.

By introducing vinyl acetate, polyvinyl acetate copolymer, or a vinyl acetate-ethylene copolymer, the resultant complex molecule is much larger, extending its various branches in all directions. It is this desirable change in the polymeric structure of the molecule to a more highly branched chain polymer of higher molecular weight that produces an adhesive with increased viscosity, quicker tack, and better fluid properties. These qualities are crucial to the strength of the most preferred embodiment of the invention. Listed below are two main benefits of this polymer adhesive system. First, increased flexural and compressive strength is realized over current gypsum wallboard ASTM standards. Secondly, the unique polymer adhesive composition of the instant invention enables a wallboard composition that is up to as much as fifty percent lighter than current gypsum wallboard.

Vinyl Acetate Polymers (VAP) separately and in combination with the other previously mentioned adhesives are also found to produce very favorable test samples and test results. The VAP utilized is a milky white liquid, with typical characteristics in the range of a melting point of 32° F. to 39° F., a vapor pressure of 16 mm Hg to 22 mm Hg (68° F. to 70° F.), specific gravity of 1.0 to 2.0, vapor density of from less than 1 to 1, a boiling point of from 212° F. to greater than 212° F., and the VAP is water miscible.

The making of vinyl acetate (VA), vinyl acetate polymers (VAP's), and vinyl acetate monomers (VAM's) onsite at the wallboard manufacturing facility further lowers the cost at the volume usage demanded for wallboard applications. VAM's and the elements that make up VAM's, which are key base compounds of VAP's, are determinative factors in the ultimate cost of the wallboard manufacturing process. Thus, using the processes and placing the equipment designed to manufacture VAP's at the wallboard manufacturing facility plays a substantial role in lowering the ultimate production cost of VAP's.

In general, VAP's are hard, brittle, yet tough resins which are found overall to be favorable to the wallboard installation process which requires that the wallboard have the ability of being cut and cleanly snapped with a common utility knife after the board has been scored. Additionally, each of the various vendor-supplied VAP's that were tested, when combined in the unique percentages of gypsum and perlite samples tested, were found to be environmentally friendly and not noxious during heat testing. Further, each of the VAP formulations available clearly exhibited the cross linking with starch and boron (through the use of boric acid), whereby a fusion occurred between the minerals and the adhesive composition. It is thus firmly believed that a chemical fusion of organic and inorganic elements in the composition of the instant invention occurs, rather than a mere adherence by the binder to the mineral. Thus, a fusion occurs which results in a chemically changed binder combination which, when heated, in turn chemically fuses the wallboard formulation.

Among some of the more preferred adhesive combinations of the instant invention are various starch amylopectins and starch dextrins in combination with borax and vinyl acetate emulsions. Starches made from amylopectin or waxy corn or maize or milo worked well with dextrin, usually white, in combination with and cross-linked to vinyl acetate emulsions through borates. This combination of starches and vinyl acetate emulsion with borax formed a highly tackable, fluid, and highly branched molecular thermosetting plastic composition for fusing of the minerals utilized in the core of the invention. This composition forms a tight web throughout the core without forming a film at the interface of the core and paper cover sheets which would not allow for proper evaporation of excess water in the board drying kiln. This web strengthens the core of the invention while utilizing lower amounts of calcium sulfate hemihydrate than in traditional standard wallboard formulations (up to 30% less). The calcium sulfate hemihydrate that is removed is displaced with expanded Perlite.

Wide ranges of polyvinyl alcohols (PVA1s) which can be made are directly dependent upon the characteristics of the intermediate polyvinyl acetate (PVA), especially the PVA's molecular weight and hydrolysis process. PVA1's are generally classified by the percentage of hydrolysis and their degree of polymerization. All polyvinyl alcohols will work in the instant application which are hydrolyzed in preferable ranges from 80 to 100%. Their degree of polymerization based on viscosity at approximately 20° C. of 4% aqueous solution, in the range of 5 cP (low viscosity) to 60 cP (high viscosity) will work in the application. The degree of polymerization of grades which work are in the range of 500 to approximately 2500. The specific PVA1 chosen, including the viscosity of the final polyvinyl acetate emulsion, or the derivative of PVA1 chosen, shall be field lab or field trial selected. It is primarily dependent on the chemical composition of the gypsum ore, the chemistry of the metered water, and to a significant extent the overall chemical makeup of the constituent additives together. As the temperature increases in the metered water or plant conditions, solubility increases. The fluidity of the wet gypsum slurry finally produced can be directly effected by the proper selection of the PVA1 and the final PVA emulsion. Low molecular weight (ca 70–80%) PVA1 hydrolyzed grades dissolve rapidly in water at normal room temperatures. It should be noted that solutions of PVA1's or in vinyl acetate emulsions mix and disperse more readily in wallboard production. They also perform better against "clay shock," as discussed elsewhere in this specification. High molecular weight PVA1's (ca 95–100%) hydrolized grades will generally exhibit higher tensile strength. Higher molecular weight PVA1's are dissolved by dispersing in cold water and heating to approximately 80–90° C. with stirring. Middle range molecular weight (ca 80–95%) grades through hydrolysis are dissolved through slow addition to cold water with stirring, although the temperature can then be raised to 60–80° C. to hasten the process.

All VAP's including vinyl acetate homopolymers and copolymers tested were found sufficient to cross-link with starch and boric acid and perform quite satisfactorily in wallboard applications. VAP emulsions exhibited preferable mixing ease, dilution and dispersion in the metered process water, and into the final wet gypsum slurry. Homopolymer emulsions were found quite favorable due to their lowest cost, their rapid setting speed, their good ability to adhere to difficult surfaces, and their "dried" strength. Emulsion homopolymers and copolymers, containing polyvinyl alcohol (PVA1) at the right percentages and molecular weight tested, increase the adhesion and cohesion strength, and increase the stabilization (thus the site storage ability) of the final vinyl acetate polymer.

Lower molecular weight polyvinyl alcohols (PVA1's) worked better in the presence of sizable clay percentage gypsum ores (i.e., above 1%), to enable initial less thickening of the final wet gypsum with perlite stucco. Higher molecular weight PVA1's increase the absorption of binder molecules onto the particles of the clay minerals or flocculation of clay particles producing in effect "clay shock." The correction for this phenomenon is to utilize lower molecular weight PVAs that are partially polymerized and hydrolyzed. Thus in essence, they are less "prepared" PVAs. Partly hydrolyzed grade PVAs such as GL-02 polyvinyl alcohols of zero to approximately 35 percent to water concentrations should be utilized or added as an anti shock agent, where there is a fairly sizable presence (i.e., above 1%) of clays in the gypsum, or in the presence of sizable clay percentages (i.e., above 0.1%) in the recycled wallboard paper being utilized.

Thickening of the final gypsum/perlite slurry can be corrected or farther corrected through other methods. One simple solution is to utilize oxidized starch in the presence of PVA1s or PVAs. Further improvements in fluidity will occur when waxy oxidized starch is used. The type of starch used, or preferred, is discussed in other parts of this specification. Higher-grade starches will produce better reactions and strength results, and should be weighed in terms of total cost in determining the final selected and prepared PVA1 and PVA copolymer or homopolymer emulsion utilized. The stability of a colloidal suspension of vinyl acetate in emulsion is determined by the length and time the emulsion must sit or be unutilized. The longer the emulsion must be "stabilized," the higher the cost of the emulsion. Therefore, lower costs are realized through the continuous use of the emulsion promptly after it is prepared, as in the continuous wallboard manufacturing application of the instant invention where the adhesive is manufactured on-site.

It has been known to use some type of sugar, such as low cost beet sugar, which is added to the edge sections of de-foamed gypsum stucco, to ultimately harden the edges of finished wallboard. The present invention also employs the optional use of a relatively small percentage of specific low cost sugars in the wallboard formulation, in order to increase overall core ASTM strength tests and further reduce cost. Further, certain sugar solutions, premixed with the preferred adhesives, provide another option towards determining optimal strength and plasticity of the combined low cost tacky compound. However, the effect of sugar addition was generally found to lower the overall cohesion of the selected adhesives. Therefore, there is a tradeoff of cost versus optimum cohesion performance, which must be determined by the manufacturer. Dryer sugar solutions such as beet sugar, or other typical current wallboard sugars utilized today, should be introduced separately from the adhesives in the final stage of the pin mixer, as they tend to react with the adhesive adversely. Making the board composite flexible or more plastic was improved over conventional methods, yet not as improved as when utilizing the preferred adhesives. Thus, cost reduction with similar edge or possible nail pull performance remained the main improvements by utilizing sugars of low appropriate percentages, in the presence of the preferred selected adhesives previously mixed with the other wallboard ingredients.

The particular type of board starch utilized is yet another important consideration. Starches, or more specifically white dextrins, are commonly utilized in gypsum wallboard production to provide a better interface between the paper and the core and to protect the gypsum crystal during drying of the board, as well as to allow for increased paper bond. A large number of dextrin grades can be utilized from lower grade cereal flour to high grade very thin boiling starches which are acid treated. Gelling and flow properties as well as compatibility are better in the higher-grade starches produced from dent corn. The quantity utilized in standard wallboard production can range anywhere from 5 to 12 pounds per thousand square feet (MSF). Typically this range is from 0.20 to 0.50 percent of the wet board weight (MSF). Testing conducted in the laboratory showed better resulting strength development using the formulation of the present invention and starch in the range of 0.30 to 0.75 percent by weight (MSF) in combination with the synthetic binder. Higher grade acid modified starches worked well in combination and to cross-link with the vinyl acetate emulsion. Further testing revealed other types of starches, including oxidized thin boiling starches, worked well if not better than acid modified starches. In some situations, oxidized starches are highly compatible with vinyl acetate emulsions as are acid treated starches. But in situations where the gypsum stucco has clay impurities, the oxidized starch can grab onto the vinyl acetate emulsion and block flocculation of clay particles with the polyvinyl alcohol, virtually eliminating "clay shock" and viscosity problems experienced in formulations where clay shock occurs. Although slightly higher in cost, oxidized starches are believed to be the least expensive and simplest solution in these clay situations. The gelling and fluid characteristics of starch play a larger role in the formulation of the present invention than in standard wall board formulations. Instead of the majority of the starch migrating to the face to protect the core to paper bond, much of the starch is retained in the core to chemically combine with the synthetic additive to fuse the minerals together. This cross-linking of the starch and synthetic additive is key to the strength development of the core of the lightweight wallboard of the present invention. In all tests, the higher grades, meaning flash dried, wet milled modified starches gave the best results in nail pull and flexural strength ASTM testing procedures over the lower grade, dry milled, belt dried starches requiring less processing than higher grade starches. The use of more intensely processed starches is somewhat a factor to consider in determining the optimum fmal wallboard costs.

It was also found favorable to raise the glass transition temperature ($T_g$) for better fire testing results of the samples tested. A higher fire rating using VAP's would certainly be preferred in wallboard construction applications. The $T_g$ range from 28° C. to 39° C., with higher $T_g$ being preferred, were examined during fire tests, and yet all were found acceptable. In order to obtain higher transition temperatures (Tg), other copolymers may be prepared and/or pre-added to the emulsion in smaller quantities, such as 2-ethyl hexylacrylate, ethyl acrylate, dibutyl fumurate, vinyl stearate, polymethyl methacrylate, or butyl methacrylate. Cost should be considered in percentages used as these will generally increase the overall modified polymer emulsion cost.

A series of compounds derived from soluble sodium silicate glasses are known as sodium silicate. Basic sodium silicates have been used as simple low cost adhesive binders in sand and earth stabilization and in mineral stabilization including sand-based formed structures at least since the early Middle Ages. Sodium silicates are used as binders in the manufacture of refractory cements, air setting refractory mortars, and in plastic cements. The amount of sodium silicates varies from a maximum of 20% for refractory mixtures to a minimum of 5% in air setting mortars. Solutions that have many diversified industrial applications result from varying the ratio of $SiO_2:Na_2O$ and the solids content. The ratio of $SiO_2:Na_2O$ controls the bonding strength of this chemical. This also changes the molecular weight of sodium silicate. Normal sodium silicate's molecular weight is 212.15 g. The addition of sodium monoxide or silica modifies the molecular weight.

Sodium silicate has a pH range of 11 to 13; 11 for more siliceous liquids and 13 for the more alkaline. The sodium silicates with ratios more alkaline than 1.6 are usually too alkaline and tend to crystallize. The more alkaline silicates have higher wetting power, while the more siliceous ones reduce the tendency to absorb water and allow drying at normal atmospheric temperatures. By dissolving glass briquettes with hot water and steam, liquid sodium silicates are produced. To adjust the $SiO_2:Na_2O$ ratio, caustic soda is used.

The application of sodium silicates alone in varying densities and solutions as a binder with the Perlite types tested in samples provided relatively low adhesion and lab test results compared with other compounds. However, when combined with vinyl acetates and liquid plastics, sodium silicates added strength and lowered total adhesive costs. Liquid sodium silicates provided by OxyChem, grades 40 to 42 Heavy, provided the most favorable lab test results. The addition of OxyChem Sodium Metasilicate Anhydrous, grade S-25 provided improved compound mixtures in some instances and shortened drying times.

Modified Aliphatic Polymers when utilized with other compounds provided lower cost and relatively fast-grabbing, fast-setting, high-strength adhesives that readily attach to and sufficiently coat the crushed or expanded Perlite particles. The modified aliphatic polymers (MAP) used in the examples that follow are water-soluble, milky white in color, almost odorless, and in the range of 45% to 47% solids. However, when tested alone (i.e., without being combined with polyurethane), the use of MAP's provided inferior lab test results.

Liquid plastics such as urethane and polyurethane, chemically treated with solvents, are utilized as bonding agents and fillers of the Perlite core. Urethane compounds consist of acrylamate resins (or acryleserols as an example) reacting with the diphenylmethane-4 or 4-diisocyanes groups. Polyisocyanates make up the key substances in polyurethane chemistry. The isocyanate group reacts with the Hydroxyl group and the resulting link between the two residues is the urethane group from which the name of the whole polyurethane chemistry is derived. The aromatic isocyanates are more reactive than the aliphatic types and they are less expensive. Toluene diisocyanate (TDI) is the largest product produced of all isocyanates. It is usually offered as a mixture of 80% 2,4-isomer and 20% 2,6-isomer, and it is available in other isomer ratios including the pure 2,4-compound. Diphenyl-methane-diisocyanate (MDI) is the second largest in volume of the diisocyanates produced. The second component of the reaction is the hydroxyl group or so-called polyol (amino-terminated components) side. Low molecular weight polyols are used as chain extenders or cross linkers which greatly influence the high-temperature properties of the resulting polyurethanes (PURs) The flexible parts of the commercial PURs are the higher molecular weights in the range of 500 to 8000. The main class of polyols are polyesters (derived from adipic acid) and polyethers (derived from propylene oxide). The combination of the above two main components of PURs in different ratios, with or without water or external blowing agents, leads to a broad range of porosity, density and modulus of elasticity levels, from rubber-like materials to the more rigid engineering thermoplastics. In the samples tested, several varying types of commercial urethanes and polyurethanes were applied. However, so long as caution is used to provide the amount (weight percentage) of urethane or polyurethane specifically set forth in the examples below, the selection of a particular urethane, polyurethane, or combination thereof is within the ability of person having ordinary skill.

Additionally, two types of solvents may optionally be employed in thinning polyurethane and urethane applications, and in the cleaning of the machinery in the manufacture of the wallboard product which are as follows.

Dipropylene glycol monomethyl ether is a solvent that is colorless and odorless with a molecular formula of CH3CHOH CH2 OCH2 CHOHCH3. It has a molecular weight of 134.18 g; a boiling point of 230° C. (450° .F), and has a specific gravity of 1.02. In the examples that follow, this chemical is not greater than 13% by weight.

Diethylene glycol monobutyl ether is a solvent that is a colorless, viscous, mobile, hydroscopic liquid with a faint odor. It has a molecular formula of C5H 18O3. It has a melting point of −68° C., a boiling point of 231° C., an evaporation rate (butyl acetate=1) of 0.01, solubility in water and ethanol, and a viscosity of 5.17 CST @25° C. This chemical is stable and incompatible with strong oxidizing agents and is less than one percent, by weight, in any of the examples listed below.

Although not separately listed, each of these solvents are present in trace amounts in any of the examples that employ polyurethane.

As mentioned above, it is a significant feature of the instant invention that the manufacture of the synthetic adhesive binder incorporated into the Examples provided below is carried out at the wallboard production facility, as opposed to being manufactured offsite and later transported to the wallboard production facility. More particularly, for those examples below that employ vinyl acetate, the base components of the binder are acetic acid and ethylene which make up a vinyl acetate homopolymer, which in turn is polymerized with a vinyl acetate monomer. Thus, the process by which this occurs and the equipment needed to accomplish the polymerization of the above-listed constituents is located at the site of the wallboard manufacturing facility to significantly reduce costs. It is additionally believed that the making of polyurethanes, acrylics, polyvinyl alcohol, potassium sodium aluminosilicate, polyvinyl chloride, sodium silicates or other synthetic adhesives on site will greatly reduce the cost in use of adhesives in wallboard manufacturing. It has most recently been discovered by the inventor herein that the selected binder can be modified or slightly altered when mixed vigorously enough with processed water to foam. The foamed binder can aid in aerating the board and decrease or even eliminate the need for soap foaming agents currently used to aerate wallboard in manufacturing. This in turn reduces the cost of the wallboard manufacturing process by reducing the need for soap foaming agents. It is believed that soap bubbles and soaps in general do nothing for and actually tend to diminish the strength of the ground gypsum, perlite particles and/or other dry constituents from bonding or cohering to each other and then to the wallboard paper plies. Soaps used today do not aid in sticking or gluing particulates together but separate or repel them from doing the same. Therefore, the binder need be of proper combination and viscosity to form the proper sized bubbles and remain reasonably constant through the kiln drying process to properly aerate the finished wallboard. Polyvinyl acetate emulsions properly selected when mixed properly with water, similar to soaps, will foam and can produce a stronger same size bubble. The binder or emulsion can be slightly altered in viscosity and by adding other binders or foaming agents to enhance proper sized bubbles that react similarly, yet firmer, than soap bubbles. Additionally, the binder or emulsion can be pre-mixed with the starch in solution to further enhance or control the foaming presence. The most important difference however from just using soap foam water is that the final combined binder solution bubbles will grab onto and adhere to the gypsum, perlite or expanded mineral, and other dry ingredients in the pin mixer and then grab onto the board paper to form more bonded, firm, and therefore stronger composite wallboard.

Compared to the high costs associated with locating synthetic gypsum plants next to power plants, and given present manufacturing labor expenses at a traditional gypsum production facility, the manufacture of the final synthetic binder at the production site exhibits significant reduction in production costs. Traditionally, synthetic wallboard energy costs are significantly reduced through the industry practice of contracting with power plants to dispose of some of the waste produce by the power plant by using it as a constituent of the synthetic wallboard, in exchange for reduced costs in the supply of electricity. Therefore, the energy costs associated with the manufacture of the adhesives at the site of the wallboard manufacturing facility are significantly reduced. Further, the presence of manufacturing labor at the wallboard manufacturing facility, which labor can likewise manufacture the adhesives, reduces the total number of employees required to manufacture the adhesives, once again reducing the overall manufacturing costs. The additional development or polymerization of other adhesives manufactured on site will additionally reduce production costs. The labor and energy required to transport the amount of adhesive material needed to manufacture mass quantities of wallboard from a location other than the site on which the wallboard is manufactured would not be logistically or financially feasible in a large production setting.

Fire Retardant additives to the adhesives, such as the addition of boric acid, reduce the overall flash point of these chemicals and therefore increase the fire rating of the core composite. Under fire rating test samples, the presence of noxious fumes were greatly reduced even to the point of being virtually eliminated as the samples moved away from the epoxies and non-water solvent adhesive mixtures. The combination of vinyl acetates with cementious materials also provided a good fire retardant combination without the addition of boric acid.

The apparatus necessary for implementing the above-described method comprises several elements which together take expanded Perlite and combine it with varying reactants, apply the mixture to a paper substrate to form a continuous sheet of laminated Perlite wallboard, convey the wet Perlite wallboard along a conveyor while subjecting it to an initial heat treatment as the wet board travels towards a rotary cutting knife, transferring the laminated assembly to a board dryer, and finally processing the dried wallboard for shipment.

As shown more particularly in the schematic Perlite processing arrangement of FIG. 1, a Perlite expander system is provided of conventional design. A preferred Perlite expander is readily commercially available from Silbrico Corporation as model number M-30, although any similarly configured Perlite expander would likewise be sufficient. The Perlite expander system comprises a covered hopper car 1 which delivers Perlite ore that has been crushed to the sieve size enumerated above to a conveyor 2 positioned beneath the hopper car 1. Conveyor 2 delivers the Perlite ore to an elevator 3 which, in turn, transfers the Perlite to an ore storage container 4. When the crushed Perlite is to be processed into expanded Perlite, a reclaim conveyor 5 is used to deliver the crushed Perlite to a Perlite ore surge bin 6, which in turn directs the crushed Perlite ore to an ore feeder 7. Ore feeder 7 directs the crushed Perlite ore via a downwardly oriented elongate chute to a four-way Perlite ore splitter 8. At ore splitter 8, the Perlite ore travels further downward through four elongate tubular passages and into the vertical furnace expanding tube of Perlite expander 9. As the crushed Perlite is introduced into the vertical furnace expanding tube of Perlite expander 9, the crushed Perlite is met by compressed air which is heated between 1000 and 2100 degrees Fahrenheit. This heating process causes the crushed Perlite material to soften while the water bound to the Perlite particles rapidly evaporates, in turn expanding the Perlite ore to between 12 to 20 times its original size and into a light, cellular particle which is commonly referred to as "expanded Perlite." Once the Perlite has been expanded, the expanded Perlite particles are light enough to travel upward in the air stream within the vertical furnace expanding tube, through a duct 10 at the top portion of the expanding tube, and into a cyclone collector 11. Within cyclone collector 11, the larger expanded Perlite particles fall downward and settle into a hopper at the lower end of the cyclone collector, while the smaller, fine expanded Perlite particles travel upward from the cyclone collector through a duct and into a dust collector 12 where they settle. Within dust collector 12, the extremely fine particles (which are generally not useable in the wallboard production process) are collected by a fiber filter media within dust collector 12. The remaining fine particles and the larger expanded Perlite particles from the hopper of cyclone collector 11 are directed to an expanded Perlite storage silo 200, as described in greater detail below.

In a preferred embodiment of the present invention, two independent Perlite expansion systems are utilized in order to provide an appropriate supply quantity of expanded Perlite to the wallboard production apparatus.

As shown in the schematic diagram of the Perlite wallboard production facility of FIG. 2, located at the feed end of each Perlite expansion system 100 is a dense phase pneumatic transport system 400 which moves the expanded Perlite from the Perlite expansion system 100 to a plurality of storage silos 200. A suitable dense phase pneumatic transport system is readily commercially available from Nol-Tec Systems, Inc. of Lino Lakes, Minn. as Transporter model number 201, although any similarly configured pneumatic transport system would likewise be sufficient. The pneumatic transport system is configured to pneumatically convey expanded Perlite from the Perlite expansion system 100 to the expanded Perlite storage silo 200, and in turn from the storage silos to a secondary feed tank 300 located within the wallboard manufacturing facility. The dense phase pneumatic transport system has the ability to fluidize the dry expanded Perlite material using air pressure, and in turn to convey the material to the desired location using sealed pressurized tubes. The transport system utilizes relatively high pressure (above 15 psig), low volume air as the force to transfer the granular bulk solids through a pipeline at low velocity, creating dense packets or slugs of expanded Perlite which travels through the conveyor system without risk of the abrasive expanded Perlite material damaging the interior of the conveyor pipeline.

It should be noted that alternate means of conveying the expanded Perlite are available, such as the utilization of a screw type conveyor or similarly configured mechanical conveyance apparatus. However, it has been found that such mechanical conveyance means used in the transport of expanded Perlite in the context of wallboard manufacture incurs a substantially higher equipment and maintenance cost. Thus, the use of a dense phase pneumatic transport system for conveyance of expanded Perlite during the wallboard manufacturing process provides a substantial improvement over traditional bulk material transport means previously used in the wallboard manufacturing process.

As mentioned above, the dense phase pneumatic transport system 400 is used to transfer expanded Perlite from the Perlite expansion system 100 to a plurality of storage silos 200 of conventional design for storing the expanded Perlite until needed for new wallboard production. Each storage silo is equipped with an airslide of conventional design and known to persons of ordinary skill in the art of dry bulk material handling. The airslide directs expanded Perlite from each of the storage silos to a transition hopper positioned above a second dense phase pneumatic transport system.

The second dense phase pneumatic transport system is used to convey expanded Perlite from the storage silos 200 to a secondary feed tank 300 inside of the wallboard manufacturing facility. This second dense phase pneumatic transport system is configured nearly identical to the first dense phase pneumatic transport system, the sole variations in the system relating to the conveyance capacity of the respective systems as determined by the wallboard production goals of the particular manufacturing facility. It should be apparent to those of ordinary skill in the art that modifications could readily be made to the precise handling capacity of each of the pneumatic transport systems in order to meet the production requirements of the particular facility, such as by modifying the diameters of the pipelines in the conveyor system or by modifying the pressure within the pipeline to in turn change the velocity of the materials being transferred within.

Traditional wallboard production facilities are plagued with the problem of significant production down-time whenever a problem with the raw material processing and storage equipment located upstream of the actual wallboard construction equipment is experienced. Such problems can include air pockets or channels within the storage silos which inhibit or prevent the free flow of material, clogged processing lines, and other common material handling problems. In order to prevent the costly losses that such down time would create, the present invention employs a secondary expanded Perlite feed tank 300 comprising a steel tank positioned within the wallboard manufacturing facility in general proximity to the wallboard construction equipment.

It is significant that traditional gypsum wallboard production facilities have been unable to dispense gypsum from a single feeder container, but instead have been required to direct processed, calcined gypsum to multiple small storage bins of limited supply capacity such that the entire supply in each bin would be consumed by the production process in a single day. The reason for using such an expensive and inconvenient supply system requiring constant replenishment relies on the fact that calcined gypsum plaster cannot be stored in large quantities as it has a tendency to absorb surrounding moisture, in turn causing premature hardening. Thus, the present improved wallboard construction process enables a simplified expanded Perlite supply tank to be utilized as the expanded Perlite lacks the moisture sensitivity and long term storage sensitivity of calcined gypsum.

As the Perlite expanders work to fill the storage silo that is least full with expanded Perlite, expanded Perlite from the most full storage silo is drawn out and directed to the secondary feed tank 300, using a programmable logic controller as is well known to those of ordinary skill in the art. By constantly maintaining at least one full silo and by always keeping the secondary feed tank filled with expanded Perlite, the risk of being forced to shut down the wallboard production line due to the above-mentioned equipment problems is at least reduced, if not eliminated altogether. The maintenance of a separate, secondary expanded Perlite feeder tank that is constantly maintained with a ready supply of expanded Perlite, and positioned adjacent the wallboard production equipment, enables any such equipment malfunctions in the remaining storage and pre-processing equipment to be resolved before the supply of expanded Perlite has diminished to such a level that it can no longer supply the expanded Perlite to the production equipment. Likewise, in the event that each element in the pre-processing and expanded Perlite storage equipment fails, the supply within the secondary feeder tank may be used to supply the expanded Perlite to the production equipment until such supply is fully consumed or the failure in the pre-processing and storage equipment is resolved.

The secondary expanded Perlite feeder tank supplies expanded Perlite to the wallboard fabrication equipment using volumetric feeders to feed the dry ingredients into a continuous auger type blender 550. A suitable volumetric feeder is readily commercially available from Acrison as Model BDF. It is of note, however, that alternate means may likewise be provided for directing the dry Perlite to the wallboard fabrication equipment, including the above-described commercially available dense phase pneumatic transport system. Further, a suitable auger type blender is readily commercially available from Acrison as Model Number 350, although any similarly configured blender will likewise suffice. Blender 550 in turn conveys the dry components of the wallboard composition to a pin mixer 600.

As explained in greater detail below, the liquid constituents 700 of the adhesives are added into the metered water, or other mixing soap or starch waters, and diluted before being added into the pin mixer 600 along with water and a foaming agent for combining with the dry components of the Perlite wallboard.

Continuous pin mixer 600 is of a conventional design, and a suitable continuous pin mixer is readily commercially available from Asa Brown Bovari ("ABB") Raymond Ehrsam Operations, although any similarly configured pin mixer would suffice. The continuous pin mixer combines the dry components of the Perlite wallboard construction with the foamed adhesives, all of which are metered into mixer 600 at a uniform rate. The resulting homogeneous wet gypsum/perlite slurry free flowing is then discharged from the continuous pin mixer through a rubber-like flat opened end boot or hose 650 (which is normally approximately 6–10 inches wide by ½ to 1½ inch rectangular opening or approximately 2½ to 4 inch diameter hose or hoses). It is preferable to comprise the exit boot or hose(s) of proper latex rubber to handle the larger and coarser Perlite when used and to widen the width of the boot or hose to compensate and more widely spread out the slurry or mixture onto the back side of the face paper. The reason is that the Perlite or expanded mineral is lighter and of lesser density and different viscosity due to the binder than the normal wet gypsum slurry, and therefore behaves slightly different in spreading uniformly and evenly onto the back side of the face paper. The face paper is delivered to the wallboard assembly line from paper handling equipment 800 positioned upstream of the pin mixer.

The paper handling equipment 800 is likewise of conventional design, and a suitable paper handling equipment arrangement is readily commercially available from ABB Raymond Ehrsam Operations, although any similarly configured paper handling equipment system would suffice. The paper handling equipment arrangement provides the backing and face paper to the wallboard production line, and generally includes paper roll racks or rotary unwind stands that hold the paper, paper pull rolls that supply the paper at a constant speed to paper tensioners which in turn automatically adjust to apply uniform tension to the paper, paper splicing tables where the end of the paper from a new roll is joined to the end of a spent roll, paper guides that automatically align two streams of paper with the boardline and ensure even paper flow downstream, paper heaters to remove any moisture from the paper, and paper creasers to prepare the paper so it folds precisely further downstream.

Wallboard forming apparatus 810 comprising an adjustable mud dam/edger and an extruder-type forming plate or forming rolls all of conventional design are located just downstream of the pin mixer. The adjustable mud dam/edger folds the already creased face paper being supplied from the paper handling equipment into position to receive the glued backing paper, while establishing the board width and edge configuration. The extruder-type forming plate or rolls determine the thickness of the wallboard as it enters the conveyor line, and brings the backing paper into contact with the mixture and gluing it to the folded face paper to create the enclosed envelope that holds the free flowing mixture in the shape of a continuous board.

After the free flowing mixture has been applied to the paper, a continuous, wet wallboard sheet is formed which proceeds along a board forming line conveyor of conventional design comprising a greenboard forming line section and a live roll section. The greenboard forming line section (shown generally at 900) comprises a flat belt surface with very closely spaced rolls to provide adequate belt support to maintain a flat board structure as the wet board travels along the board forming line, and generally extends approximately two-thirds of the distance between the forming plate or rolls and a cut-off knife 910. The live roll section (shown generally at 950) extends the remaining one-third of the distance, and serves to deliver partially set board to the cut-off knife. The live roll section 950 comprises open rolls which allow exposure of the board face to the air and help the final greenboard set prior to cutting. An aligning device of conventional design is also positioned ahead of the knife which positions the board to assure a square cut.

It is important in the wallboard manufacturing process to ensure that the greenboard is sufficiently set by the time it reaches the cutting knife so that the knife is able to make a clean cut through the wallboard without picking up excessive wet substrate material from the board which in turn could gum up the knife surface. In the examples set forth below in which gypsum is not used as a setting or hardening agent in the composition, in order to ensure that the Perlite wallboard of the present invention has reached a sufficiently dry state to prevent the substrate from collecting on the knife surface, the Perlite wallboard forming line is preferably provided with an optional initial heat treatment means which directs heat towards the wet wallboard as it travels from the forming plate or rolls to the cut-off knife. However, another substantial benefit arises from the heat treatment of the wet board prior to cutting, and that is the significant cost reduction realized by the reduction in processing times and temperatures required to fully set the board within the drying kiln, as explained in greater detail below.

In a first embodiment of the heat treatment means, a tunnel 920 is provided which encapsulates the board line between the forming plate or rolls and the cut-off knife. The tunnel is provided with a series of interconnected air ducts 921 along its upper interior surface, air ducts 921 being configured to direct hot air directly downward on the wet board as it travels along the board line. Heat is supplied to the tunnel using any conventional and readily commercially available air duct system which directs heat from the hot air recycling system of the drying kiln 1200 (discussed in greater detail below) to the duct work located at the ceiling of the heating tunnel. Fans are suspended from the ceiling of the heating tunnel to direct the heated air from the downwardly directed air ducts to the board line.

In a second embodiment of the heat treatment means, a series of drying hoods are positioned over the board line. The hoods are of conventional design for a standard ventilation hood, and generally comprise a wide, open-mouth air duct opening which faces the surface to be heated (i.e., the board line), and a section of duct work which extends upward from the wide, open-mouth air duct opening and which narrows as it rises away from the air duct opening until it reaches the diameter of the remainder of the duct work. Fans are positioned within the air duct to direct the heated air into the ducts and out of the hoods towards the board line. As in the first embodiment, heat is supplied to the individual drying hoods using any conventional and readily commercially available air duct system which directs heat from the hot air recycling system of the drying kiln (discussed in greater detail below) to the drying hoods.

After the board has traveled along the belt forming and live roll dewatering sections, the continuous wallboard is cut into individual sheets using a rotary cut-off knife 910 of conventional design. A suitable rotary cut-off knife is readily commercially available from ABB Raymond Ehrsam Operations of Abilene, Kans., although any similarly configured cut-off knife would likewise suffice. The cutting is performed by two knife blades, each mounted on a rotor, one above and one below the board. When cutting, the rotors run slightly faster than the speed of the board line to assure that the knife blades make a straight cut.

Following the cutting of the board by the rotary cut-off knife, the individual wallboard sheets are directed along a board accelerator section (shown generally at 960) of conventional design. A suitable board accelerator section is readily commercially available from ABB Raymond Ehrsam operations of Abilene, Kans., although any similarly configured accelerating conveyor section would likewise suffice. The board accelerator section comprises sets of rolls turning at increasing speeds to accelerate the cut boards beyond the cut-off knife in order to provide adequate spacing between boards to allow time for transfer and inversion of the boards to the dryer infeed section of the boardline. At the end of the accelerator section, the boards are received by a board transfer/inverter assembly 1000 of conventional design. A suitable board transfer/ inverter assembly is readily commercially available from ABB Raymond Ehrsam operations of Abilene, Kans., although, once again, any similarly configured panel transfer/inverter assembly would suffice. The transfer/inverter moves the boards laterally at 90 degrees to the boardline while turning the boards face side up and aligning them side by side before they are introduced into the drying kiln.

Once the boards have been inverted and transferred to the dryer infeed section of the boardline, a dryer infeed assembly (shown generally at 1100) comprising a conveyor directs boards from the board transfer/inverter assembly to the multideck infeed section of the drying kiln. A suitable dryer infeed assembly is readily commercially available from ABB Fläkt Industri Ab of Växjö, Sweden, although any similarly configured conveyor-type feeder system would suffice.

Drying kiln 1200 of the present invention comprises a plurality of tiers, preferably between 12 and 15, of roller conveyors which receive wallboard at the inlet end of the kiln, convey the wallboard through the multiple heating zone drying section, and discharge the wallboard at the outlet end of the kiln. The basic configuration of the drying kiln is of conventional design and well known to those of ordinary skill in the art, and a suitable board drier kiln is readily commercially available from ABB Fläkt Industri Ab of Växjö, Sweden. The preferred drying kiln of the present invention comprises a two heating zone kiln of conventional design. It is significant, however, that the use of Perlite as the primary constituent of the wallboard of the present invention and the process of providing an initial heat treatment of the wet board prior to cutting allows the drying process to be carried out at significantly lower operational temperatures within the drying kiln. These lower operational temperatures provide a significant cost savings in both energy consumed in the drying process and in premature wear in the components of the dryer itself caused by long term exposure to extreme operating temperatures.

As mentioned above, the heat supplied to the optional heat treatment assembly over the wet board line is supplied by tapping the hot air recycling system of the drying kiln. As shown in FIG. 2, in a conventional wallboard drying kiln configuration, stacks 1210 which comprise a flue or exhaust pipe extending upward from the kiln and through the roof of the manufacturing facility are located at each end of the drying kiln to enable moisture laden hot air to escape from the interior of the kiln. The release of this moisture aids in the evaporation process to drive off the excess water that is present in the wallboard product. As the air rises in the stack, a portion of the air is captured through side ducts located in the sidewalls of the stacks. The side ducts are provided with fans which direct at least a portion of the rising air into the ducts which in turn direct the captured air to a condenser. The condenser recaptures the moisture from the air, and the now dry air is returned into the air inlet 1220 of the drying kiln. Such a hot air recycling system is well known to those or ordinary skill. The present invention redirects the heated dry air exiting the condenser through duct work of conventional design to the optional heat treatment apparatus situated above the board line, as explained in depth above.

Following the drying stage, the fully set Perlite wallboard exits the drying kiln via a dryer outfeed system 1300 of conventional design. A suitable dryer outfeed system is readily commercially available from ABB Fläkt Industri AB of Växjö, Sweden, although any similarly configured conveyor-type outfeed system would suffice. The dryer outfeed system in turn directs the Perlite wallboard to dry wallboard handling apparatus, including a transfer-booker 1400, a board bundler 1500, and a board stacker 1600.

A suitable transfer-booker 1400 of conventional design is readily commercially available from ABB Raymond Ehrsam Operations of Abilene, Kans., and is used to move each pair of boards off of the dry end boardline onto a receiving table supported by a plurality of rolls, which rolls drop away to allow a series of belts to rotate the board by 90 degrees. Hydraulically actuated arms then lift opposing ends of each pair of boards such that the boards are brought together face to face to protect the smooth outer surfaces of the wallboard from damage during handling, storage, and shipping.

The paired or "booked" boards are then directed to a board bundler 1500 of conventional design which squares and aligns the pair of boards, trims them to precise finished length, and tapes the ends. A suitable board bundler of conventional design is readily commercially available from ABB Raymond Ehrsam Operations of Abilene, Kans.

Finally, after the wallboards have been bundled, they are transferred via a board stacker or assembly of conventional design to a mechanism which automatically aligns the bundles and places them one upon another such that the bundles may be lifted and carried by a forklift to a storage location. A suitable board stacker assembly of conventional design is readily commercially available from ABB Raymond Ehrsam Operations of Abilene, Kans.

It is significantly of note that several of the above-identified elements used in the process of manufacturing Perlite wallboard as set forth in this specification are likewise in use in current gypsum board line equipment. Thus, the present apparatus not only provides a new and unique system for manufacturing Perlite wallboard, but also provides a means by which an existing gypsum wallboard manufacturing facility may be easily and readily transformed into a Perlite wallboard manufacturing facility. Thus, by making minor modifications to a traditional gypsum wallboard production facility, and by adding the additional equipment listed above (e.g., secondary expanded Perlite feed tank, adhesives storage equipment, mixing equipment, and the optional initial heat treatment tunnel and duct work interconnecting the heat treatment tunnel to the standard kiln air recycling system) to an existing gypsum boardline, an existing gypsum wallboard manufacturing facility may be smoothly and economically transitioned into a manufacturing facility for the improved wallboard of the instant invention, without the investment costs of building an entirely new production plant.

EXAMPLES

Wallboard samples were prepared to evaluate both replacing part of the gypsum currently utilized in a conventional formulation process, and replacing gypsum as a whole in wallboard manufacturing. The gypsum-based core was replaced or supplemented with expanded minerals (e.g., Perlite), adhesives, curing agents, retardants, and fillers. Small quantities of cementious materials in the range of five to twenty percent added structural strength. Yet, quantities of cementious materials over ten percent added appreciable weight to the Perlite based core. Approximately ten (10) percent of a calcium carbonate based compound or equivalent added density and continuity to the core while moderately increasing structural strength. Lighter weight stucco calcium sulfate based material provided similar results with a reduction in overall weight of the samples tested. Some adhesives and fillers were first mixed together while others were mixed directly with other ingredients. Hundreds upon hundreds of differing combinations of reduced amounts of gypsum and Perlite cores of differing densities and sizes along with adhesives and the other additives previously mentioned were tried and tested. Differing moisture resistant and fire retardant cover materials were applied once a favorable core composite was found. The resultant examples that follow proved to bring very favorable test results.

Example 1

In the first example, the expanded Perlite of horticulture grade quality was supplied from Redco II in California. Five percent to 40% of modified aliphatic polymer and from 1% to 40% of the polyurethane compound were mixed together, then from 5% to 15% of the calcium sulfate based mixture was added and thoroughly blended. A nearly fifty-fifty blend of the aliphatic polymer with the polyurethane compound in the thirty to forty five percent range proved to provide the best test results. Five percent to 50% of the smaller sieve-sized expanded Perlite was then added to the mixture to form a thick slurry before being combined with 5% to 35% of the expanded Perlite and thoroughly mixed. This then formed the new lightweight, strengthened Perlite core for the wallboard.

| Ingredient | Amount, wt. % | Preferred, wt. % |
|---|---|---|
| Modified aliphatic polymer | 5–40% | 17.5% |
| Polyurethane | 1–40% | 23.5% |
| Calcium Sulfate | 5–15% | 11.5% |
| Expanded Perlite | 5–50% | 17.6% |
| Small sieve expanded Perlite | 5–35% | 29.9% |

The mixture was then formed and heated to 170° C. over a one-hour period to remove moisture. Heating in the laboratory oven was applied at a constant temperature; however, forced hot air provides an even better result over a shorter period of time. The addition of five percent or less of a curing agent cut the drying time nearly in half.

The Perlite wallboard cover material consists of a whitish, moisture resistant paper in the range of 20–24 pounds with a plastic polymer core. The paper is then treated with a fire-retardant spray similar to Zynolyte high temperature spray 1200° F.

During laboratory testing, the Perlite samples were struck with a framing hammer and typically exhibited damage to only one side of the sample. Typical gypsum wallboard would have fractured into numerous pieces while allowing the hammer blow of same pressure to penetrate both surfaces. The expanded Perlite core of the wallboard absorbs the impact, cushioning the blow and centralizing the damage in the area around the hammerhead. The blow is further cushioned by applying a paper-plastic-paper laminate in the 11 to 24 pound range to cover the Perlite based core.

Example 2

| Ingredient | Amount, wt. % | Preferred, wt. % |
|---|---|---|
| Vinyl acetate | 1–40% | 20.0% |
| Polyurethane | 1–40% | 28.5% |
| Potassium sodium aluminoscillate | 5–15% | 7.0% |
| Perlite, expanded | 5–50% | 28.5% |
| Perlite, fines | 5–35% | 16.0% |

In the second series of samples, total elimination of the calcium sulfate based mixture was analyzed. Additional synthetic adhesives combined with vinyl acetate forming new compounds replaced the calcium carbonate based mixture with impressive results. One specific example combined vinyl acetate with a liquid polyurethane mixture and then added synthetic potassium sodium aluminosilicate as a curing agent. In this example the liquid adhesives (vinyl acetate and polyurethane) were mixed together first. The dry ingredients, including the Perlite types and the curing agent (potassium sodium aluminoscillate) were mixed together second, and then the liquid adhesives were folded in third. As described in Example One, crushed and expanded Perlite were combined from samples supplied by the Pennsylvania Perlite Corporation in Central Pennsylvania. There were noticeable differences in the various sizes of Perlite received, which resulted in a large improvement in the weight, texture, and strength of these samples. The addition of the plastic adhesives greatly improved the amount of airborne particulates as compared to typical gypsum board when cut or scraped through the core surface. Specifically, a 12" by 3" by ½" sample tested included 2 ounces of lentil-size expanded Perlite, 0.53 ounce of 30Y expanded Perlite, 0.52 ounce of 24Y expanded Perlite, 2 ounces of polyurethane mixture, 1.5 ounces of vinyl acetate, and 0.5 ounce of potassium sodium aluminosilicate. This sample cured well at 160° C. for a one-hour period, with a resultant edge hardness of 20.9 lbf, exceeding the ASTM C473 standard of 11 lbf. As in example 1, a hammer blow penetrated but one side of the sample, limiting the impact area of the hammer head to that area around the hammer head. This sample was also covered by a laminated paper, which assisted in lessening the impact of the hammer blow, thus limiting the depth of impact to only one side of the sample. However, edge hardness depends on the core composition, not the bonding paper veneer.

Example 3

| Ingredient | Amount, wt. % | Preferred, wt. % |
|---|---|---|
| Portland Cement | 5–15% | 10% |
| Vinyl Acetate | 1–40% | 13.3% |
| Polyurethane | 5–40% | 16.6% |
| Perlite, expanded | 5–50% | 20.0% |
| Perlite, fines | 5–30% | 13.3% |
| Water | 5–50% | 26.8% |

In the third example, the addition of Portland cement was added to the other adhesives to increase compressive strength and for the purpose of limiting the wallboard's flexibility. A series of 6×6×½-inch samples were prepared with the known light adhesive compounds used in previous examples, namely, vinyl acetate and polyurethane. While the weight was increased by the addition of the Portland cement, the overall strength was also increased. A nail-pull resistance test, according to ASTM C473, was conducted and yielded a result of 77 lbf. A noticeable increase in edge hardness was also realized and tested according to ASTM C473, with a resultant edge hardness of 34.0 lbf, exceeding the ASTM C473 standard of 11 lbf for a half inch sample. The addition of adhesives with the Portland cement greatly decreased the air borne particulates as compared and typically found in cutting or sanding gypsum wallboard. An excess of greater than 11% of Portland cement by weight inhibited the ability to cut the material in a manner consistent with cutting typical gypsum wallboard. Also, synthetic plastic cement was tried exhibiting more impressive bond strength with the adhesives, yet the overall structural strength was lessened by as much as 50% over the use of Portland cement. In all of these samples tested, no gypsum-based material was added or needed to pass the minimum ASTM requirements for gypsum wallboard. Flexibility versus hardness of the material, including hammer blows to the wallboard, was analyzed by inspection comparison to typical gypsum wallboard. Again the similar manual framing hammer blows were localized around the hammer head in the Perlite wallboard, and were in most every instance restricted to penetrating only one side of the material. The gypsum ½ inch regular wallboard was brittle and the same type hammer blows penetrated through the gypsum wallboard in many instances. The absence of the Portland cementious material, or the like thereof, allows for more flexibility in the wallboard, thus keeping it from breaking properly when scored, yet it produced an average of 30% or more lower flexural strength results. Thus, in this example, improvements to the "cut and snap" and overall 30% or more flexural strength increase occurred with the addition of an approximate 10% weight increase, by adding Portland cementious material to the Perlite wallboard samples tested.

Example 4

| Ingredient | Amount, wt. % | Preferred, wt. % |
| --- | --- | --- |
| Perlite | 5–50% | 25% |
| Vinyl acetate | 1–40% | 30% |
| Portland cement | 5–15% | 10% |
| Water | 5–50% | 35% |

In this example, lower amounts of Perlite were used; about 25%, and increased adhesives and water were used. These were a vinyl acetate-based adhesive of about 30% and Portland Cement of about 10% with the remainder being water of about 35%. The mixture was a very wet slurry and was poured into a form and heated at 170 degrees centigrade for one hour. The increased water content entrains air into the slurry, resulting in a much lighter sample. This sample was completely devoid of calcined gypsum or calcium sulfate. The resulting weight difference over previous samples is significant, namely, about 20%. The sample scored favorable test results, but were not as high as previous samples with a greater density and was not as strong.

Example 5

| Ingredient | Amount, wt. % | Preferred, wt. % |
| --- | --- | --- |
| Perlite, Expanded | 5–50% | 17.5% |
| Perlite, Fines | 5–50% | 17.5% |
| Sodium silicate | 5–40% | 30% |
| Polyurethane | 1–40% | 10% |
| Water | 5–50% | 25% |

In this example, two different grades of Perlite from Pennsylvania Perlite Co. were used, a concrete grade and a Pff24 grade. Sodium silicate, about 30%; polyurethane, about 10%; and the remainder being water, about 25% were added to about 35% Perlite, making 100% of a slurry. This mixture in slab form was heated to 170 degrees centigrade for 30 minutes to remove excess moisture. Once cooled, this sample (as with previous samples) was covered with laminated material and prepared for testing. These ASTM tests are comprised of flexural, compression, tensile, and edge hardness to meet or exceed current gypsum-based wallboard standards. In all of the above samples, test results far exceed gypsum wallboard ratings.

Example 6

| Ingredient | Amount, wt. % | Preferred, wt. % |
| --- | --- | --- |
| Perlite, expanded | 5–50% | 30% |
| Calcium sulfate | 5–40% | 23% |
| Polyvinyl chloride | 1–15% | 5% |
| Water | 5–50% | 42% |

In this example, the first step was to mix about 30% commercial Perlite with about 23% calcium sulfate, and the balance being a 5% solution of polyvinyl chloride emulsion in about 42% of water making 100% of a slurry. The mixture was then poured into a form and let set for about 10 minutes, becoming fairly hard, and was then heated at 130 degrees centigrade for one hour. The intent was to form a plastic PVC web throughout the composite matrix during heating after the plaster had set. Once cooled, this sample was fairly hard and dense but was 40% lighter than the (gypsum core) control sample. Test results showed that vinyl acetate still scored higher than less preferred binders such as polyvinyl chloride.

Example 7

| Ingredient | Amount, wt. % | Preferred, wt. % |
| --- | --- | --- |
| Perlite | 5–50% | 25% |
| Starch | .001–15% | 8% |
| Boric acid | .001–10% | 2% |
| Calcium sulfate | 5–40% | 10% |
| Vinyl acetate | 1–40% | 5% |
| Water | 5–50% | 50% |

This example discloses a composition reflecting the most preferred embodiment of the improved wallboard composition of the instant invention, and continues the study of the addition of small percentages of calcium sulfate into the composite core. It is also a test of an adhesive formulation comprising vinyl acetate polymer emulsion, modified starch, and boric acid. In this test, the first step was to mix about 25% Perlite of which 50% or more of said Perlite is in the 10–50 sieve size range, and smaller sized Perlite which nearly 3% passes through a 100 mesh sieve. The Perlite (25% by weight) was combined with 8% modified starch, 2.5% boric acid, and about 10% calcium sulfate. Next, about 5% vinyl acetate emulsion was added to about 50% water. The wet and dry ingredients were then combined and mixed for about thirty seconds. The slurry was then poured into a form with a paper covering inserted onto it. After the slurry was leveled, the top of the paper envelope was laid on top. The sample set up fairly hard in about three minutes. The sample was then removed from the form and heated at 160° C. for about an hour. Once cooled, the sample was weighed and measured and the results were catalogued. Several days later this sample was conditioned and then tested to ASTM C473 standards. Test results confirmed nearly double those of the gypsum core control sample in nail pull resistance, edge hardness, and with improved flexural strength.

Example 8

| Ingredient | Amount, wt. % | Preferred, wt. % |
| --- | --- | --- |
| Perlite | 5–50% | 35% |
| Starch | .001–15% | 8% |
| Boric acid | .001–10% | 2% |
| Vinyl acetate | 1–40% | 5% |
| Water | 5–50% | 50% |

In this example, the same formulation used in example 7 minus the 10% calcium sulfate was used. The resulting weight difference was made up with Perlite. The same procedure was used except the sample was not removed from the form. This test confirmed the need to preheat the boardline prior to the knife in order to harden the board and to start the curing process at an earlier stage in formulations void of calcium sulfate, as set forth in greater detail above.

Example 9

| Ingredient | Amount, wt. % | Preferred, wt. % |
| --- | --- | --- |
| Calcium sulfate | 20–60% | 47.18% |
| Starch | .001–15% | 0.353% |
| Raw gypsum accelerator | .001–5% | 0.314% |
| Potassium sulfate | .001–5% | 0.157% |
| Boric acid | .001–10% | 0.094% |
| Vinyl acetate | 1–40% | 6.29% |
| Ethoxysulfate | .001–3% | 0.580% |
| Water | 5–50% | 45.032% |

This example discloses the addition of the unique adhesive formulation of the instant invention into traditional gypsum wallboard without an expanded mineral added. Calcium sulfate, starch, raw gypsum, potassium sulfate, and boric acid were combined in the above amounts. Then, Ethoxysulfate, vinyl acetate, and water were combined and mixed into a foamy consistency and combined with the dry ingredients. The mixture was mixed at high speed and then poured into a form with a wallboard paper insert and sealed and formed into a sheet identical to traditional gypsum wallboard. The sample was then removed from the form and the set was timed. After timing the set and allowing the full hydration set to occur, the sample was then heated in a kiln at 180° F. to evaporate excess water. Once dry, these boards were left to cure for two days and then tested. These experiments were conducted to evaluate increased strength in traditional wallboard compositions with the addition of the synthetic binder. Set time to the knife was decreased by 25% overall, and nail pull resistance, edge hardness, and flexural strength were increased 150% in all the samples that were made and tested. This decrease in set time and increase in strength of the wallboard can allow for increased operating speeds in current wallboard manufacturing facilities. Varying curing temperatures were applied in this example from 75° C. to 352° C. with favorable test results. However, the preferred curing temperatures ranged from 79° C. to 275° C.

Example 10

| Ingredient | Amount, wt. % | Preferred, wt. % |
| --- | --- | --- |
| Perlite | 11–47.5% | 13.429% |
| Calcined Gypsum | 0–40% | 29.082% |
| Starch | 0.001–15% | 0.894% |
| Ball Mill Accelerator | 0.001–5% | 0.357% |
| Pot Ash | 0.001–5% | 0.178% |
| Boric Acid | 0.001–10% | 0.134% |
| Vinyl Acetate | 1–40% | 9.080% |
| Soap Water | 1–30% | 15.527% |
| Lignosite | 0.001–3% | 0.026% |
| Water | 5–50% | 31.293% |

In this example, first the dry ingredients were combined together and blended until a homogeneous mix was achieved, these dry ingredients being plaster grade expanded perlite with a loose density of 6 to 8 pounds per cubic foot, calcined gypsum stucco, starch, ball mill land plaster accelerator, pot ash and boric acid. Secondly, the dry lignosite dispersant was combined with the water and mixed until blended. Thirdly, the soap water and vinyl acetate were combined together and blended with an electric mixer to generate foam or bubbles. The soap water and vinyl acetate foam mix was then added to the lignosite and water and then all the wet ingredients were combined with the dry blended ingredients and mixed by hand for about 15 seconds to achieve 100% of a slurry. The ambient temperature was 82° F. and the surrounding humidity was 29%. This slurry was then poured into a standard wallboard paper insert or envelope to make a ½ ninch thick wallboard sample measuring 6 inches by 6 inches. The back sheet of the insert was then sealed to the face sheet folds using a starch based drywall edge paste, formed, and then removed from the form, and the initial or snap set was timed and recorded. In a typical drywall manufacturing process there are two different sets, first being the initial or snap set, whereas the continuous board hardens or stiffens sufficiently to be cut into desired lengths downstream at the rotary knife. The secondary or hydration set relates to the complete hydration of the gypsum crystals, meaning the amount of time sufficient to rehydrate the calcined gypsum, replacing the two molecules of $H_2O$ removed during the calcining process of land plaster. This secondary hydration set can be from as low as 4.6 minutes to as high as 7 minutes depending on the grind and purity of the land plaster being utilized. When higher quantities of the synthetic binder were added, the resulting set times were reduced even to the point of setting before the mix could be poured into the paper insert envelope, the lowest being recorded at 30 seconds. This is substantially less than current standard drywall snap set times of 3½ to 4½ minutes to the knife. At 2½ minutes the sample of the above example was cut cleanly and inspected. The inspection revealed that the slurry had completely hardened and it is believed that the chemical reaction of the synthetic binder (vinyl acetate) and the calcined gypsum allows the gypsum crystal to rehydrate more rapidly than calcined gypsum rehydrated without the synthetic additive of the present invention. The above process has been duplicated repeatedly in the lab with slight variations in formula achieving the same results. A range of volumes of the preferred synthetic binder (vinyl acetate) were tested with gypsum and consistently set times were reduced over those of the gypsum control samples with no synthetic additives, and consistently stronger samples were obtained over those of the gypsum control samples with no synthetic additives. All procedures including the drying of the samples were consistent with typical drywall manufacturing processes. The excess water in the samples was driven off by placing samples in a laboratory kiln with access to moving heated air at a temperature of between 150° C. and 200° C. for a period of 50 minutes to 1 hour.

While each of the above examples establish that an improved, light weight wallboard product may be provided which largely reduces the amount of gypsum present in the wallboard product from what has been required by previous gypsum wallboard formulations, it is also important to note that the synthetic binders described herein may also be applied to wallboard compositions having smaller amounts of an expanded mineral to provide a lighter weight, strengthened wallboard product over those that have been previously known in the art, as reflected by the following examples:

Example 11

| ½" Regular | WT Percent | WT Ounces |
|---|---|---|
| Perlite | 1.609 | .20 |
| Calcined Gypsum Stucco | 41.851 | 5.2 |
| Starch | .563 | .070 |
| Ball Mill Accelerator | .281 | .035 |
| Dextrose | .040 | .005 |
| Boric acid | .120 | .015 |
| Vinyl Acetate | 2.414 | .30 |
| Soap Water | 16.096 | 2.0 |
| Water | 37.022 | 4.6 |
| Lignosite | .0040 | .0005 |

In this example, first the dry ingredients were combined together and blended until a homogenous mix was achieved, these dry ingredients being cryogenic grade Perlite with a loose density of 4 pounds per cubic foot, calcined gypsum stucco of approximately 83% purity, starch, ball mill land plaster accelerator, dextrose, and boric acid. Secondly, the lignosite was combined with the water and blended. Thirdly, the soap water was mixed with the vinyl acetate emulsion until thoroughly blended to a foamy consistency and combined with the water and lignosite mixture. The liquid constituents were then combined with the dry blended ingredients and mixed by hand for about 15 seconds to achieve 100% of a slurry. This slurry was then poured into an envelope insert of standard wallboard paper to make a ½ inch thick wallboard sample measuring 6 inches by 6 inches. The face of the envelope was then seated to the folds of the back of the envelope using a starch based drywall edge paste, formed, and then removed from the form. The initial set was timed and recorded. After hydration was completed, the sample was placed into a small laboratory kiln and heated at 275° C. for 20 minutes. The heat was then reduced to 180° C. for 20 minutes, then to 70° C. for another 20 minutes, and finally was allowed to cool. Dry weight was recorded and evaporation rate was recorded to assure that the combined water was retained. In some instances with various and differing gypsum deposits, impurities such as clays, limestone, and salts can cause adverse reactions in the viscosity of the adhesive system of the present invention. In these instances, additives such as a solution of lower molecular weight polyvinyl alcohol as described earlier, or surfactants can be included in the formulation to optimize the performance of the adhesive system.

Example 12

A large scale trial run of the formulation by weight percentages of example 11 was run using the weights and percentages listed below as the starting formulation for making ½" regular wallboard:

|  | Weight pounds MSF | Percent WT |
|---|---|---|
| Calcined Gypsum Stucco | 891.0 | 39.292 |
| Perlite | 30.0 | 1.322 |
| Starch | 9.0 | .396 |
| Ball Mill Accelerator | 10.0 | .440 |
| Boric Acid | 1.0 | .044 |
| Fiber Glass | .50 | .022 |
| Dispersent (DAXAD 19W) | 1.50 | .066 |
| Foaming Agent (THATCHER) | .70 | .036 |
| Retarder | .20 | .008 |
| Water | 1170.0 | 51.598 |
| Vinyl Acetate | 63.693 | 2.808 |
| Paper | 90.0 | 3.968 |
| Total | 2267.593 | 100.0 |

After starting the trial production run at 10:30 a.m., one gallon of water was added to the slurry, and a wet weight was recorded of 2316 pounds per MSF. Net weight varied from 2422 pounds for a high and 2304 for a low between 10:30 a.m. and 11:04 a.m. At 11:05 a.m., 10 pounds of stucco were added and 8.5 pounds (1 gallon) of water were removed from the mix to adjust the fluidity of the slurry. The board was sampled at the takeoff at 11:40 a.m., and a dry weight of 1306 pounds was recorded. S-Cut showed excellent bond characteristics, and core development edge hardness was good (22 pounds). At 12:05 p.m., the vinyl acetate was reduced to 45.495 pounds per MSF, and the Perlite was reduced to 22.5 lbs. (6 cubic ft). Gypsum stucco remained at 917.5 pounds MSF, and the total water remained at 1189 pounds MSF. Wet weights recorded of random wet wallboard samples were 2365, 2333 and 2292 pounds between 12:05 p.m. and 2:30 p.m. Dry Weight at the takeoff was recorded at 1296 pounds. Foam was down 60% at 2:30 p.m. Gypsum stucco was raised to 934 lbs., and Perlite was reduced to 15 lbs. MSF (4 cubic ft). Water was reduced to 49 lbs. MSF, with foam back up 60% at 3:00 p.m. Wet weights recorded were 2319 lbs. at 2:42 p.m. and 2338 lbs. at 2:57, and dry weight was recorded at the takeoff of 1348 lbs.

At 3:05 p.m., the vinyl acetate was reduced to 25.5 lbs. MSF. All other constituent weights remained the same. The wet weight at 3:10 p.m. was 2284 lbs., and at 4:00 p.m. was recorded at 2263 pounds. At 3:40 p.m., the dry weight at the take off was 1322 pounds MSF, and at 4:30 p.m., the dry weight was 1310 lbs. MSF. The run was completed at 5:10 p.m. Test results for this trial run are listed in table II below.

TABLE II

| | | Force in Pounds | | |
| | Time | Flexural Against Grain | Strength With Grain | Edge Hardness |
|---|---|---|---|---|
| Sample 1 | 11:30 am | Face up 151 | Face up 59 | 23 |
| Sample 2 | 2:00 pm | Face Down 141 | Face Down 53.7 | 19 |
| Sample 3 | 3:30 pm | Face up 160.2 | Face up 58.9 | 22 |
| Sample 4 | 4:10 pm | Face up 162 | Face up 63 | 24 |

Nail pull improved to beyond passing in samples taken at approximately 3:15 p.m.

I claim:

1. A slurry composition suitable for use in the manufacture of construction grade wallboard comprising:
   expanded perlite present at about 0.5% up to about 47.5% by weight of the total wet weight of the slurry, said expanded perlite being water-permeable;
   calcium sulfate present at about 5% up to about 60% by weight of the total wet weight of the slurry; and
   a vinyl acetate emulsion comprising a homogeneous blend of suspended polyvinyl acetate particles in polyvinyl alcohol and water.

2. The composition of claim 1, wherein said vinyl acetate emulsion is present at about 0.001% to about 40% by weight of the total wet weight of the slurry.

3. The composition of claim 1, where said polyvinyl alcohol is present in said vinyl acetate emulsion at about 0.10% to about 30% by weight of the total weight of the emulsion.

4. The composition of claim 1, wherein said polyvinyl alcohol is about 80% to about 100% hydrolyzed.

5. A slurry composition suitable for use in the manufacture of construction grade wallboard comprising:
   a dry powder mineral substrate selected from the group of minerals consisting of calcium sulfate, perlite, and combinations thereof; and
   a synthetic binder comprising a vinyl acetate emulsion, starch, and a boron source.

6. The composition of claim 5, wherein said starch is selected from the group consisting of corn starch, dent corn starch, oxidized starch, waxy oxidized starch, dextrin, and white-canary dextrin.

7. The composition of claim 5, wherein said boron source is selected from the group consisting of borate and boric acid.

8. The composition of claim 5, wherein said boron source is selected from the group consisting of sodium tetraborate pentahydrate and sodium tetraborate decahydrate.

9. The composition of claim 5, wherein said vinyl acetate emulsion is present at about 0.001% to about 40% by weight of the total wet weight of the slurry.

10. The composition of claim 5, wherein said starch is present at about 0.001% to about 15% by weight of the total wet weight of the slurry.

11. The composition of claim 10, wherein said starch is present at about 0.353% to about 10% by weight of the total wet weight of the slurry.

12. The composition of claim 5, wherein said boron source is present at about 0.001% to about 10% by weight of the total wet weight of the slurry.

13. The composition of claim 12, wherein said boron source is present at about 0.01% to about 2.5% by weight of the total wet weight of the slurry.

14. The composition of claim 5, wherein said vinyl acetate emulsion comprises a water-soluble organic polymer selected from the group consisting of vinyl acetate, polyvinyl alcohol, partially hydrolyzed polyvinyl alcohol, a derivative of polyvinyl acetate with polyvinyl alcohol, and combinations thereof.

15. A wallboard composition comprising:
   a mineral selected from the group consisting of calcium sulfate, perlite, and combinations thereof;
   a vinyl acetate emulsion comprising a homogeneous blend of suspended polyvinyl acetate particles in polyvinyl alcohol and water; and
   paper cover sheets sandwiching said mineral and said vinyl acetate emulsion therebetween, said paper cover sheets formed from a virgin paper pulp comprising fibers having a length of at least one inch.

16. A wallboard composition comprising:
   a mineral selected from the group consisting of calcium sulfate, perlite, and combinations thereof;
   a vinyl acetate emulsion comprising a homogeneous blend of suspended polyvinyl acetate particles in polyvinyl alcohol and water; and
   paper cover sheets sandwiching said mineral and said vinyl acetate emulsion therebetween, said paper cover sheets further comprising a fire retardant agent.

17. The composition of claim 16, wherein said fire retardant agent comprises an agent selected from the group consisting of boric acid, zinc borate, sulfamates, diammonium phosphate, nitrogen compounds, antimony oxide, silica, titanium oxide, zircon, and combinations thereof.

18. The composition of claim 17, wherein said fire retardant agent is present at about 0.15% to about 3% by weight of the finished wallboard.

19. A method of manufacturing a construction grade wallboard product comprising the steps of:
   forming a mixture by adding a mineral selected from the group consisting of calcium sulfate, perlite, and combinations thereof, to a vinyl acetate emulsion comprising a homogeneous blend of suspended polyvinyl acetate particles in polyvinyl alcohol and water;
   combining said mixture with a suitable amount of water;
   gradually preparing a slurry by mixing and stirring said mixture and said water to form said slurry;
   enveloping said slurry between two paper cover sheets to form a wet board; and
   drying said wet board at a temperature in the range of 75° C. to 325° C.

20. The method of claim 19, further comprising the step of:
   applying heat to said wet after said enveloping step and prior to said drying step.

21. The method of claim 19, further comprising the step of:
   adding starch and borate to said vinyl acetate emulsion prior to mixing said vinyl acetate emulsion with said mineral.

22. The method of claim 21, in which said vinyl acetate emulsion is present in the amount of about 0.001% to about 40% by weight of the total wet weight of the slurry.

23. The method of claim 22, in which said starch is selected from the group consisting of corn starch, dent corn starch, oxidized starch, waxy oxidized starch, dextrin, white-canary dextrin, and combinations thereof.

24. The method of claim 22, in which said starch is present in the amount of about 0.001% to about 15% by weight of the total wet weight of the slurry.

25. The method of claim 24, in which said starch is present in the amount of about 0.353% to about 8% by weight of the total wet weight of the slurry.

26. The method of claim 22, in which said borate is selected from the group consisting of sodium tetraborate pentahydrate and sodium tetraborate decahydrate.

27. The method of claim 22, in which said borate is present in the amount of about 0.001% to about 10% by weight of the total wet weight of the slurry.

28. The method of claim 27, in which said borate is present in the amount of about 0.01% to about 2.5% by weight of the total wet weight of the slurry.

29. A slurry composition suitable for use in the manufacture of construction grade wallboard, said slurry composition, when hardened, forming a rigid core situated between two paper cover sheets, said slurry composition comprising:
- a dry powder mineral substrate selected from the group of minerals consisting of calcium sulfate, perlite, and combinations thereof; and
- a vinyl acetate emulsion comprising a homogeneous blend of suspended polyvinyl acetate particles in polyvinyl alcohol and water.

30. The composition of claim 29, wherein said vinyl acetate emulsion is present at about 0.001% to about 40% by weight of the total wet weight of the slurry.

31. The composition of claim 29, wherein said polyvinyl alcohol is present in said vinyl acetate emulsion at about 0.10% to about 30% by weight of the total weight of the emulsion.

32. The composition of claim 29, wherein said polyvinyl alcohol is about 80% to about 100% hyrdrolyzed.

33. A wallboard composition comprising:
- a mineral selected from the group consisting of calcium sulfate, perlite, and combinations thereof;
- a vinyl acetate emulsion comprising a homogeneous blend of suspended polyvinyl acetate particles in polyvinyl alcohol and water; and
- paper cover sheets sandwiching said mineral and said vinyl acetate emulsion therebetween.

34. A wallboard composition comprising:
- a mineral selected from the group consisting of calcium sulfate, perlite, and combinations thereof;
- a synthetic binder comprising a vinyl acetate emulsion, starch, and a boron source; and
- paper cover sheets sandwiching said mineral and said vinyl acetate emulsion therebetween.

* * * * *